(12) United States Patent
Ganz et al.

(10) Patent No.: US 8,255,807 B2
(45) Date of Patent: Aug. 28, 2012

(54) ITEM CUSTOMIZATION AND WEBSITE CUSTOMIZATION

(75) Inventors: Howard Ganz, North York (CA); Karl Joseph Borst, Toronto (CA)

(73) Assignee: Ganz, Woodbridge, Ontario ( * ) Notice: Subject to any disclaimer, the term of this patent is extended or adjusted under 35 U.S.C. 154(b) by 316 days.

(21) Appl. No.: 12/554,294

(22) Filed: Sep. 4, 2009

(65) Prior Publication Data

US 2010/0162137 A1   Jun. 24, 2010

Related U.S. Application Data

(60) Provisional application No. 61/140,256, filed on Dec. 23, 2008.

(51) Int. Cl.
   *G06F 3/00* (2006.01)
   *A63H 30/00* (2006.01)
   *G06Q 30/00* (2012.01)

(52) U.S. Cl. ............... 715/747; 446/175; 705/14.56; 705/26.5

(58) Field of Classification Search .............. 446/175; 715/747; 705/14.56, 26.5
   See application file for complete search history.

(56) References Cited

U.S. PATENT DOCUMENTS

| 5,411,259 | A   | 5/1995  | Pearson |
| 5,880,731 | A   | 3/1999  | Liles et al. |
| 5,886,697 | A   | 3/1999  | Naughton et al. |
| 5,926,179 | A   | 7/1999  | Matsuda et al. |
| 6,009,458 | A * | 12/1999 | Hawkins et al. ............ 709/203 |
| 6,116,906 | A * | 9/2000  | Rifkin ........................ 434/105 |
| 6,119,229 | A   | 9/2000  | Martinez et al. |
| 6,159,101 | A   | 12/2000 | Simpson |
| 6,160,986 | A   | 12/2000 | Gabai et al. |
| 6,200,216 | B1  | 3/2001  | Peppel |
| 6,267,672 | B1  | 7/2001  | Vance |
| 6,273,815 | B1  | 8/2001  | Stuckman |
| 6,290,566 | B1  | 9/2001  | Gabai et al. |
| 6,368,177 | B1  | 4/2002  | Gabai et al. |
| 6,404,438 | B1  | 6/2002  | Hatlelid et al. |
| 6,406,370 | B1  | 6/2002  | Kumagai |
| 6,468,155 | B1  | 10/2002 | Zucker et al. |
| 6,476,830 | B1  | 11/2002 | Farmer et al. |
| 6,494,762 | B1  | 12/2002 | Bushmitch et al. |
| 6,522,333 | B1  | 2/2003  | Hatlelid et al. |

(Continued)

FOREIGN PATENT DOCUMENTS

CA   2331244 A1   7/2001

(Continued)

OTHER PUBLICATIONS

IGN, "Pokémon: Blue and Red," Apr. 4, 2005, http://web.archive.org/web/20050404012120/http://guides.ign.com/guides/16708/index.html.*

(Continued)

*Primary Examiner* — Ryan Pitaro
*Assistant Examiner* — Ryan Barrett
(74) *Attorney, Agent, or Firm* — Pearne & Gordon LLP

(57) ABSTRACT

Customized item that is usable on both a website as an item in a virtual world, and outside the website as a tangible item in the real world is provided and described. One single customization is used to create both items. The item can be the same in the virtual world as it is in the virtual world, or can be different in the virtual world.

57 Claims, 16 Drawing Sheets

U.S. PATENT DOCUMENTS

| | | | |
|---|---|---|---|
| 6,539,400 B1 | 3/2003 | Bloomfield | |
| 6,554,679 B1 | 4/2003 | Shackelford et al. | |
| 6,595,858 B1 | 7/2003 | Tajiri | |
| 6,612,501 B1 | 9/2003 | Woll et al. | |
| 6,616,532 B2 | 9/2003 | Albrecht | |
| 6,663,105 B1 | 12/2003 | Sullivan | |
| 6,685,565 B2 | 2/2004 | Tanibuchi et al. | |
| 6,692,360 B2 | 2/2004 | Kusuda et al. | |
| 6,720,949 B1 | 4/2004 | Pryor | |
| 6,722,973 B2 | 4/2004 | Akaishi | |
| 6,729,884 B1 | 5/2004 | Kelton et al. | |
| 6,739,941 B1 | 5/2004 | Brownsberger | |
| 6,745,236 B1 | 6/2004 | Hawkins et al. | |
| 6,758,746 B1 | 7/2004 | Hunter | |
| 6,773,325 B1 * | 8/2004 | Mawle et al. | 446/175 |
| 6,773,344 B1 | 8/2004 | Gabai et al. | |
| 6,910,186 B2 | 6/2005 | Kim | |
| 6,918,833 B2 | 7/2005 | Emmerson | |
| 6,944,421 B2 | 9/2005 | Axelrod | |
| 6,948,131 B1 | 9/2005 | Neven et al. | |
| 6,951,516 B1 | 10/2005 | Eguchi et al. | |
| 6,954,728 B1 | 10/2005 | Kusumoto et al. | |
| 6,959,166 B1 | 10/2005 | Gabai et al. | |
| 7,037,166 B2 | 5/2006 | Shrock et al. | |
| 7,054,831 B2 | 5/2006 | Koenig | |
| 7,066,781 B2 | 6/2006 | Weston | |
| 7,081,033 B1 * | 7/2006 | Mawle et al. | 446/175 |
| 7,086,923 B2 | 8/2006 | Karabees | |
| 7,092,899 B2 | 8/2006 | Simas et al. | |
| 7,171,154 B2 | 1/2007 | Fujisawa | |
| 7,249,139 B2 | 7/2007 | Chuah | |
| 7,266,522 B2 | 9/2007 | Dutta | |
| 7,288,028 B2 | 10/2007 | Rodriquez et al. | |
| 7,297,063 B2 | 11/2007 | Fujisawa | |
| 7,314,407 B1 | 1/2008 | Pearson | |
| 7,396,281 B2 | 7/2008 | Mendelsohn et al. | |
| 7,404,141 B1 | 7/2008 | Giljum et al. | |
| 7,425,169 B2 | 9/2008 | Ganz | |
| 7,442,108 B2 | 10/2008 | Ganz | |
| 7,465,212 B2 | 12/2008 | Ganz | |
| 7,478,047 B2 | 1/2009 | Loyall et al. | |
| 7,480,597 B2 | 1/2009 | Clark et al. | |
| 7,488,231 B2 | 2/2009 | Weston | |
| 7,534,157 B2 | 5/2009 | Ganz | |
| 7,556,563 B2 | 7/2009 | Ellis et al. | |
| 7,568,964 B2 | 8/2009 | Ganz | |
| 7,596,473 B2 | 9/2009 | Hansen et al. | |
| 7,604,525 B2 | 10/2009 | Ganz | |
| 7,618,303 B2 | 11/2009 | Ganz | |
| 2002/0002514 A1 | 1/2002 | Kamachi et al. | |
| 2002/0082077 A1 | 6/2002 | Johnson et al. | |
| 2002/0090985 A1 | 7/2002 | Tochner et al. | |
| 2002/0100040 A1 | 7/2002 | Bull | |
| 2002/0119810 A1 | 8/2002 | Takatsuka et al. | |
| 2002/0160835 A1 | 10/2002 | Fujioka et al. | |
| 2002/0183119 A1 | 12/2002 | Fessler | |
| 2002/0198781 A1 | 12/2002 | Cobley | |
| 2003/0126031 A1 | 7/2003 | Asami | |
| 2004/0043806 A1 * | 3/2004 | Kirby et al. | 463/6 |
| 2004/0053690 A1 | 3/2004 | Fogel et al. | |
| 2004/0093266 A1 | 5/2004 | Dohring | |
| 2004/0143852 A1 | 7/2004 | Meyers | |
| 2004/0193489 A1 | 9/2004 | Boyd et al. | |
| 2004/0242326 A1 | 12/2004 | Fujisawa et al. | |
| 2005/0043076 A1 | 2/2005 | Lin | |
| 2005/0059483 A1 | 3/2005 | Borge | |
| 2005/0071225 A1 | 3/2005 | Bortolin et al. | |
| 2005/0080687 A1 * | 4/2005 | Self | 705/28 |
| 2005/0137015 A1 | 6/2005 | Rogers | |
| 2005/0177428 A1 * | 8/2005 | Ganz | 705/14 |
| 2005/0182693 A1 * | 8/2005 | Alivandi | 705/27 |
| 2005/0233744 A1 | 10/2005 | Karaoguz et al. | |
| 2005/0250415 A1 | 11/2005 | Barthold | |
| 2005/0250416 A1 | 11/2005 | Barthold | |
| 2006/0035692 A1 | 2/2006 | Kirby et al. | |
| 2006/0076735 A1 * | 4/2006 | Proch et al. | 273/298 |
| 2006/0093142 A1 | 5/2006 | Schneier et al. | |
| 2006/0123127 A1 | 6/2006 | Littlefield | |
| 2006/0160594 A1 | 7/2006 | Brase | |
| 2006/0293103 A1 * | 12/2006 | Mendelsohn | 463/42 |
| 2007/0063997 A1 | 3/2007 | Scherer et al. | |
| 2007/0073582 A1 | 3/2007 | Jung et al. | |
| 2007/0082720 A1 | 4/2007 | Bradbury et al. | |
| 2007/0082738 A1 | 4/2007 | Fickie et al. | |
| 2007/0088656 A1 | 4/2007 | Jung et al. | |
| 2007/0099685 A1 | 5/2007 | Van Luchene | |
| 2007/0112624 A1 | 5/2007 | Jung et al. | |
| 2007/0121843 A1 | 5/2007 | Atazky et al. | |
| 2007/0129998 A1 | 6/2007 | Postrel | |
| 2007/0130001 A1 | 6/2007 | Jung et al. | |
| 2007/0174304 A1 | 7/2007 | Shrufi et al. | |
| 2007/0226062 A1 | 9/2007 | Hughes et al. | |
| 2008/0009351 A1 | 1/2008 | Ganz et al. | |
| 2008/0039166 A1 | 2/2008 | Harris et al. | |
| 2008/0070690 A1 | 3/2008 | Van Luchene | |
| 2008/0109313 A1 | 5/2008 | Ganz et al. | |
| 2008/0120558 A1 * | 5/2008 | Nathan et al. | 715/764 |
| 2008/0134099 A1 | 6/2008 | Ganz | |
| 2008/0158232 A1 * | 7/2008 | Shuster | 345/474 |
| 2008/0163055 A1 | 7/2008 | Ganz et al. | |
| 2008/0163379 A1 | 7/2008 | Robinson et al. | |
| 2008/0214253 A1 * | 9/2008 | Gillo et al. | 463/1 |
| 2008/0215974 A1 | 9/2008 | Harrison et al. | |
| 2008/0221998 A1 | 9/2008 | Mendelsohn | |
| 2008/0250315 A1 * | 10/2008 | Eronen et al. | 715/706 |
| 2008/0261687 A1 | 10/2008 | Gatzios | |
| 2008/0280684 A1 * | 11/2008 | McBride et al. | 463/42 |
| 2009/0030808 A1 * | 1/2009 | Park | 705/26 |
| 2009/0053970 A1 | 2/2009 | Borge | |
| 2009/0054155 A1 | 2/2009 | Borge | |
| 2009/0055249 A1 * | 2/2009 | Lieberman | 705/10 |
| 2009/0063282 A1 | 3/2009 | Ganz et al. | |
| 2009/0098918 A1 * | 4/2009 | Teasdale et al. | 463/7 |
| 2009/0112718 A1 * | 4/2009 | Steelberg et al. | 705/14 |
| 2009/0131164 A1 | 5/2009 | Ganz | |
| 2009/0132267 A1 | 5/2009 | Ganz | |
| 2009/0132357 A1 | 5/2009 | Ganz | |
| 2009/0132656 A1 | 5/2009 | Ganz | |
| 2009/0149248 A1 * | 6/2009 | Busey et al. | 463/29 |
| 2009/0204420 A1 | 8/2009 | Ganz | |
| 2009/0248544 A1 | 10/2009 | Ganz | |
| 2009/0253475 A1 * | 10/2009 | Thompson et al. | 463/7 |
| 2009/0285483 A1 * | 11/2009 | Guven et al. | 382/181 |
| 2009/0318229 A1 | 12/2009 | Zielinski et al. | |
| 2011/0078055 A1 * | 3/2011 | Faribault et al. | 705/27.2 |

FOREIGN PATENT DOCUMENTS

| | | | |
|---|---|---|---|
| CA | 2378301 A1 | 9/2002 | |
| CA | 2552367 A1 | 7/2005 | |
| EP | 1217560 A1 | 6/2002 | |
| EP | 1382372 A1 | 1/2004 | |
| WO | 02/54327 A1 | 1/2001 | |
| WO | 01/69829 A2 | 9/2001 | |
| WO | 03034303 A1 | 4/2003 | |
| WO | 0227591 A1 | 4/2004 | |
| WO | 2007101785 A1 | 9/2007 | |
| WO | 2008067668 A1 | 6/2008 | |

OTHER PUBLICATIONS

Lee, "Widgets add flair to dress up Web sites", San Francisco Chronicle, Sep. 3, 2007, http://www.sfgate.com/cgi-bin/article.cgi?f=/c/a/2007/09/03/BUG14RTHD31.DTL&ao=all.*

Virtual World News, Interview: Stardoll Announces Partnership with Spreadshirt for User-Created Clothes, Apr. 3, 2008.

Spence, Jennifer. "Neopet Nation." Toronto Star, Mar. 13, 2003.

Mark Ward, "Virtual cash exchange goes live" BBC News Online, Jan. 7, 2004.

Lehdonvirta, Vili. "Real-Money Trade of Virtual Assets: Ten Different User Perceptions." Proceedings of Digital Art and Culture, Helsinki Institute for Information Technology, IT University of Copenhagen (2005): 1-3.

Lehdonvirta, Vili, "Virtual Economics: Applying Economics to the Study of Game Worlds"; Helsinki Institute for Technology, 2005.

http://web.archive.org.web.20031202190119/www.monopets.com/, Dec. 2, 2003.

Grace, "Web Site Tycoon's Next Goal: Sixth Grade"; Woonsocket Call, Jun. 19, 2002.
Erica Naone, Moving Freely between Virtual Worlds, Technology Review, MIT Oct. 29, 2007.
Daniel Terdiman, "Tech titans seek virtual-world interoperablitiy" CNET News, Oct. 12, 2007.
"The Sims Booklet," dated 2000.
Neopian Hospital, retrieved Mar. 24, 2010.
Neopets—Archeology, retrieved Mar. 25, 2010.
The Helpful Neopian, retrieved Mar. 25, 2010.
Augmenting the Virtual Domain with Physical and Social Elements—Magerkurth (Jun. 3, 2004).

* cited by examiner

ITEM CUSTOMIZATION AND WEBSITE CUSTOMIZATION

CROSS-REFERENCE TO RELATED APPLICATION

This application claims priority from application Ser. No. 61/140,256, filed Dec. 23, 2008, the entire contents of which are herewith incorporated by reference.

BACKGROUND

Our previous application, publication number 20050177428 describes an embodiment which uses both a real item and a virtual item on a website; where the real item and the virtual item look similar to one another. In this application, a tangible item is packaged with a code, and that code is later used to register the virtual representation of the tangible item into the Internet virtual world.

The virtual representation may be a replica of, or similar to, the actual item.

SUMMARY

An interface for making customized item(s) is described, with a first part that uses the customization to form or order a tangible item, and a second part that uses the same customization to create or generate a virtual item that corresponds to the customized tangible item.

Another embodiment describes customization of avatars on two websites and use of the customized avatars in different ways on the two websites.

DETAILED DESCRIPTION

Figure 1:
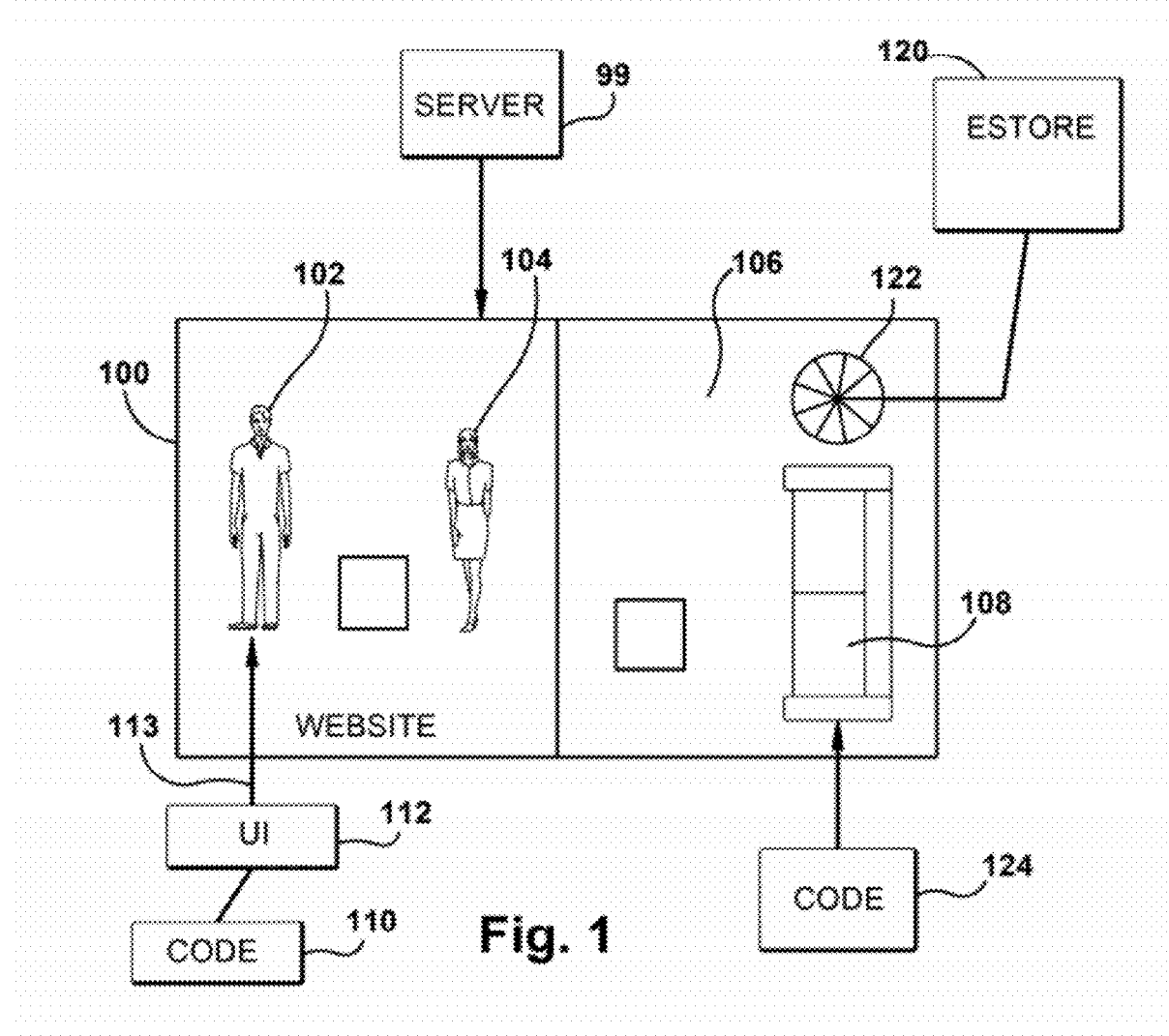
FIG. 1 shows a basic system diagram.

FIG. 1 illustrates an embodiment. In this embodiment, there is a basic website, shown as 100, with at least one virtual character or avatar thereon. The avatars are shown as 102 and 104. Each of the virtual characters 102, 104 may have a different look that is recognizable and allows the user to distinguish between the different avatars, e.g., to determine one avatar 102 as being different from the other avatar 104. Characters on the website 100 may also have virtual rooms that are personal to the user. Virtual rooms such as 106 may have virtual furnishings such as 108.

The characters 102, 104 can be already on the website 100, or can be added to the website 100 using a code such as described in our co-pending application. The code can be provided by a purchase, for example, one embodiment may require purchase of a tangible item, e.g., a toy or collectable item. The tangible item is packaged with a code that is usable on a website to create an avatar that resembles the tangible item.

In one embodiment, a user interface 112 may be sent over a network such as 113 to be displayed on a client computer. The code 110 is entered into a user interface 112 for the website 100. Entry of a code such as 110 into the website 100 causes a character 102 or 104 to be displayed on the website 100. The specific character 102 or 104 that is displayed is dependent on the code that has been entered. The codes 110 may be unique so that each code corresponds to one character and can be used only once.

Items for the virtual room 106, such as the furnishings 108 and another item 122, can be obtained in a number of different ways. The items can be purchased on the website 100. The codes such as 110 can also be purchased on the website 100. There can also be an E store, which may be another website that is associated with the website 100. The E store, shown as 120, allows purchasing items or codes directly. For example, the item 122 may have been purchased directly on the E store. The item 108 may have been purchased using a code 124.

Figure 2:
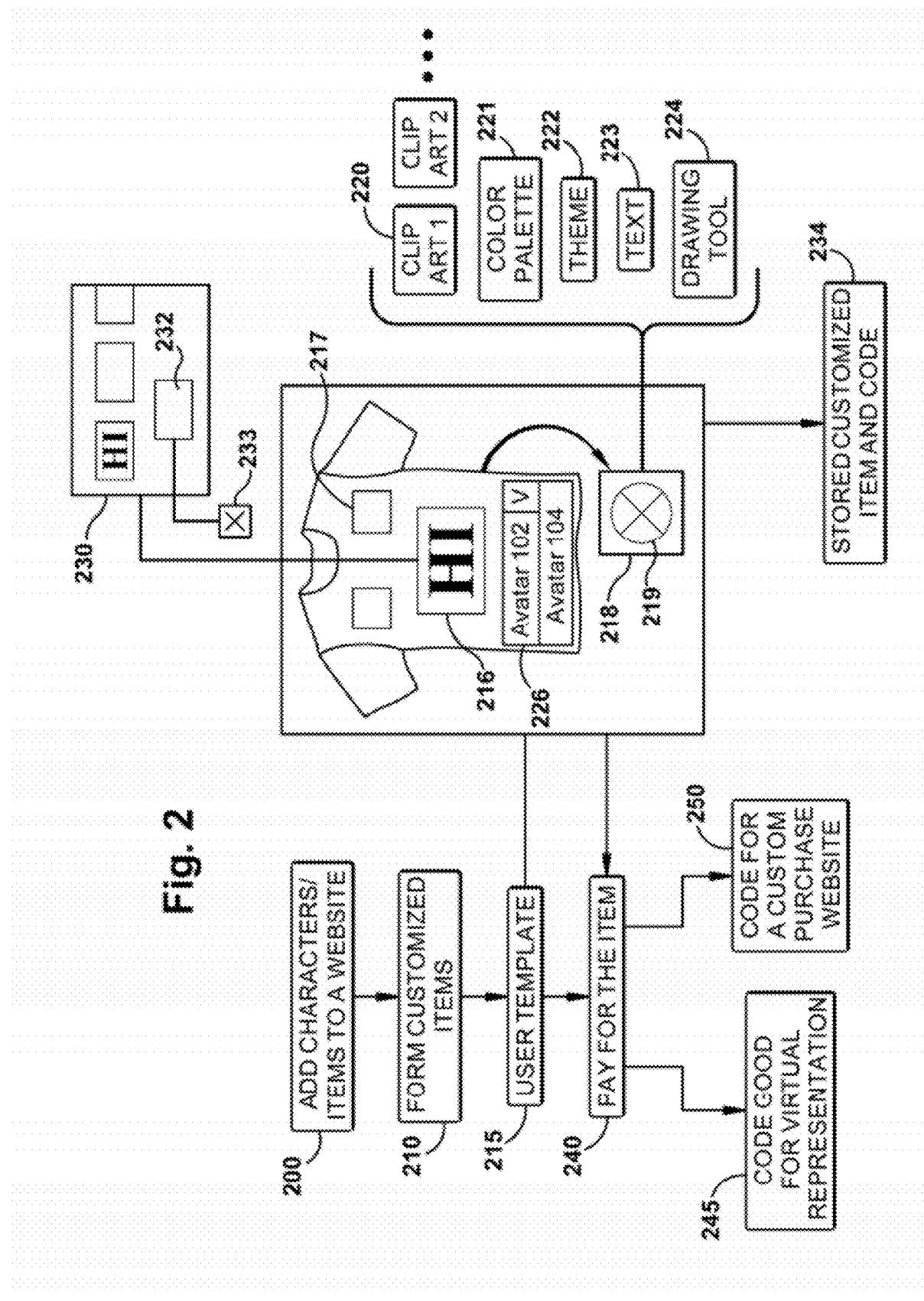
FIG. 2 shows an exemplary flowchart of operation.

FIG. 2 illustrates a flow chart which may be carried out by a server computer 99 (see FIG. 1) that runs programs that create the virtual environment within the website 100. 200 shows the general step of adding characters/items to the website 100. As described above, 200 can use any technique that has been known in the art, including the technique of selling a tangible product that includes a code 110 that is entered into a computer to form a virtual representation of the tangible product, as in our copending U.S. publication number 20050177428, the entire contents of which are herewith incorporated by reference.

The items on the website, referred to herein as the avatar customization site, can be customized by a user so that their personal item is different than the generic item. For example, the user's avatar can be customized to have different clothing, different amounts of strength, different accessories such as eyeglasses, different shoes, different colors of items, etc. The avatar can be customized by adding an item that is purchased. For example, the item can be purchased, the user is given a code indicative of the item that has been purchased, and the code is entered into the computer. The entered code can form a customization for the avatar.

Once the avatar is registered, information about the avatar is stored in the user's account. The user can have multiple avatars in their account. The user can also interact with the avatar on the website 110 to take actions with the avatar, e.g., to feed the avatar, to move the avatar, etc. The health, happiness and hunger of the avatar can be managed via this interaction. The website can for example show the avatar's current health, happiness and hunger. These are examples of things that the user can do to virtually take care of the avatar. The user can take other actions to take care of the avatar.

The user can also interact with the avatar in other ways to train the avatar. This can provide skills attributes and talents of the avatar that represent the training of the avatar.

The health, happiness, and hunger and the skills, attributes and talents of the avatar are stored with the avatar, and information about these may be displayed when the user opens or calls up the avatar from their account.

At 210, the user is offered an option, for example via the web via the E store 120, or via a separate website totally unrelated to the website 100, to form a customized item based on their customized avatar. This other site is referred to herein as the item customization site.

The customized items in this embodiment are items that can be used both in a virtual world on the website 100, and also in the real world. For example, 210 may allow the user to create a customized T-shirt, with a customized logo and/or wording on the T-shirt. Other items can also be formed at 210, including, but not limited to, clothing of any type, caps, posters, weapons (e.g., toy weapons), room decor in general, pet supplies, or any other item which can exist both in the virtual world and in the real world. The items in the virtual world can include any virtual item usable on a website, and with which an avatar or character on the website can interact, e.g., clothing to be worn by the avatar, or virtual furnishings or other objects for virtual rooms that in which the avatar resides or exists. In all cases, the "items" provided by the customization may all be codes that are usable in the current website or in another website. The code can be entered into the website and used to open or call up the actual item that has been customized.

The user is presented with a template for the item at 215. The template, for example, may have a drawing of the item. In the illustrated embodiment, the item is a T-shirt, and the template shows a T-shirt with fields, such as shown at 216, 217, 218 and 226, that can be filled in on the T-shirt as part of the customization. Each of the fields 216-218 may be text fields, graphics fields, or other types of fields. In one embodiment, field 216 may be a text field, and 217 may be a graphics field. Field 218, representing a graphic to be printed on the back of the T-shirt in this embodiment, may also be a graphics field. The user can select any field, such as 218 in FIG. 2 shown by the focus 219, and receive a palette of options that can be entered in the field. The palette can include, for example, a library of clip art 220, a color scheme palette such as 221, a theme such as 222, text such as 223 for text art, a drawing tool 224 and/or the like. In the illustrated embodiment, the drawing tool 224 may bring up a drawing item that allows freeform drawings drawn by the user, or allows uploading of the user's own drawings. In one embodiment, there may also be a filter that monitors the drawings to restrict the use of obscene or pornographic drawings.

The field 226 is a drop-down field, in which the customized avatars from the site 100 are selectable. FIG. 2 shows how the different customized avatars 102, 104 can be selected from the drop down menu 226, and become part of the customized item. The items on the menu 226 may be actually imported from another website that includes the customized avatars. Therefore, the user selects from a series of snapshots of previously-customized avatars to make the customized item. One advantage is that this allows reaching the consumer on any other website, based on information provided on the avatar customization website.

This allows the user to select from a group of "snapshots", where the snapshot is for example taken from another website on which the customization is possible. The user can see a series of their customized avatars from other sites.

In one embodiment, a text field, such as 216, may also access a text filter shown as 230, that allows entering only specific words including greeting words, words corresponding to allowable names of pets, or others. The text filter 230 may be similar to the one disclosed for filtering room names in our co-pending U.S. patent application Ser. No. 12/203,324, filed Sep. 3, 2008, the entirety of which is incorporated by reference herein. In another embodiment, the text tool may allow entry of freeform text such as 232, via an obscenity filter such as 233. The obscenity filter 233 may be as disclosed in our co-pending U.S. patent application Ser. No. 12/042,045, filed on Mar. 4, 2008, the entirety of which is incorporated by reference herein.

At 240, once the customized item is completely designed, the user is given a chance to pay for the item. This can be via a credit card, via credit previously placed in an account, via a code that is redeemable for one such item, via virtual currency that exists only on the site, or via some other suitable mechanism.

After paying for the item, the user obtains information for both a virtual version of the item, and also for a tangible version of the item. The tangible version is an item that exists in the real world—e.g., the actual item such as T-shirt, cup or poster that was designed by the user. The virtual version of that item exists on the website.

First, the user is given a first code redeemable for the virtual representation of the customized item. The customized item is stored at 234 along with the first code. However, the first code is either invalidated, inactive, or withheld from the user, until the user pays at 240. At 245, the user is given the first code that is redeemable for the virtual representation. In this embodiment, entry of the first code into the user interface 112 of the website 100 causes a customized virtual representation to appear on the website 100. Also in response to the user paying at 240, at 250 the user is given a second code for a custom purchase website. The custom purchase website allows the user to enter the second code, displays the stored item from 234, and provides shipping information about that item.

In other words, the end result of FIG. 2 may be two different codes, the first code which can be redeemed for the virtual item on the website 100, and the second code which allows obtaining the real item (that substantially resembles or is identical to the virtual item). Another embodiment, however, may automatically communicate the first code to the website 100 after paying for the item, to cause the virtual representation to automatically appear. According to another embodiment, the custom purchased item at 250 may automatically be ordered, with either a stored user address being used for shipment, or the user being required to enter their information as part of the payment information at 240.

In this way, a user can order an item, and receive the item both as a tangible item in the real world and as a virtual item for the use by one or more of the avatars 102, 104 on the website 100. When the virtual item is an item of clothing, the avatar 102 or 104 can wear the item of clothing on the website 100. For example, where the virtual item is a T-shirt, hat or other clothing, it can be worn by the avatar 102 or 104 on the website 100. Where the virtual item is room decor in general of some form or another, that room decor can be customized and sent to the user, and also added to the virtual room 106 on the website 100. In the real world, the customized t-shirt, for example, can be made to be worn by the user. Alternatively, the customized t-shirt can be made for the user's tangible toy, pet or other tangible item that correlates to a virtual representation of the tangible toy, pet or other tangible item on the website (see related publication number 20050177428). The disclosed embodiments refer to a T-shirt as being the customized item, however other customized items may be made, including other clothing, as well as non-clothing items such as but not limited to room decorations and furnishings, posters, pictures, dishes, toys, pet supplies, or others.

The above embodiment allows a user to make a design on a website, and get two items based on that design. One or both items may be obtained via a code which can be used on another site so that there are two different versions of the customized item: a real (tangible) item and a virtual version of the real item (e.g., a virtual customized item), both formed based on the same customization information. The customization information includes a first code and a second code. When entered on the website, the first code causes the virtual customized item to be shown on said website. The second code, when entered, permits creating the tangible version of the customized item. In addition, the second code can also permit purchase of the tangible version of the customized item. Alternatively, the first code is provided directly to the website and automatically causes the virtual customized item to be created on said website.

According to another embodiment, the entire operation can be done within a single site, for example the Webkinz™ E store. In one embodiment, after entering the E store, a user indicates a desire to make customized clothing, and the user gets a pull down menu of characters for which customization can be carried out. A user can pick any of the characters from the pull down list. Then, the user can make a customization that uses that character as the theme for the item. The character that is the subject of the theme can be dressed, for example, in the customized clothing, and the clothing can also be made in the real world.

According to a particular embodiment, the clothing that is customized may be customized in a first way for the virtual clothing to be used by the character, and customized in a second way for the tangible clothing to be given to the user. For example, if a user's pet's name is Fluffy, that user might want a T-shirt that has a picture of Fluffy on it, and that says "I Love Fluffy". However, when the avatar of Fluffy is wearing the T-shirt, it might look odd for the avatar to wear a T-shirt that says "I Love Fluffy". The customization may make a special virtual shirt for Fluffy that just says "Fluffy" or "I am Fluffy", for instance, and at the same time make a customized real or tangible shirt for the user that says "I Love Fluffy". Thus, the customization may be based on the same general information for both the avatar and tangible item, but may be carried out differently for the avatar than it is carried out for the tangible item. The virtual representation, for example, may look like the T-shirt that has been customized, without the specific words about Fluffy.

Another embodiment is illustrated with reference to the flowchart of FIG. 3. In the site described according to the present embodiment, the user may obtain an avatar and carry out certain customizations to that avatar. For example, a simple version of those customizations may include the user simply providing the avatar clothing, or buying virtual items for the avatar. In this way, the avatar which the user has produced on the website is different from the avatar the user originally obtained. This customization causes the avatar to be different so that each user's avatars are in general different from each other user's avatars. This can be done on an "avatar customization" site.

Other customizations are of course possible; for example, strength or health customizations are also possible.

In general, the virtual version existing on the website is customized for that user. In addition, the user may have multiple different avatars on one or many websites.

Figure 3:
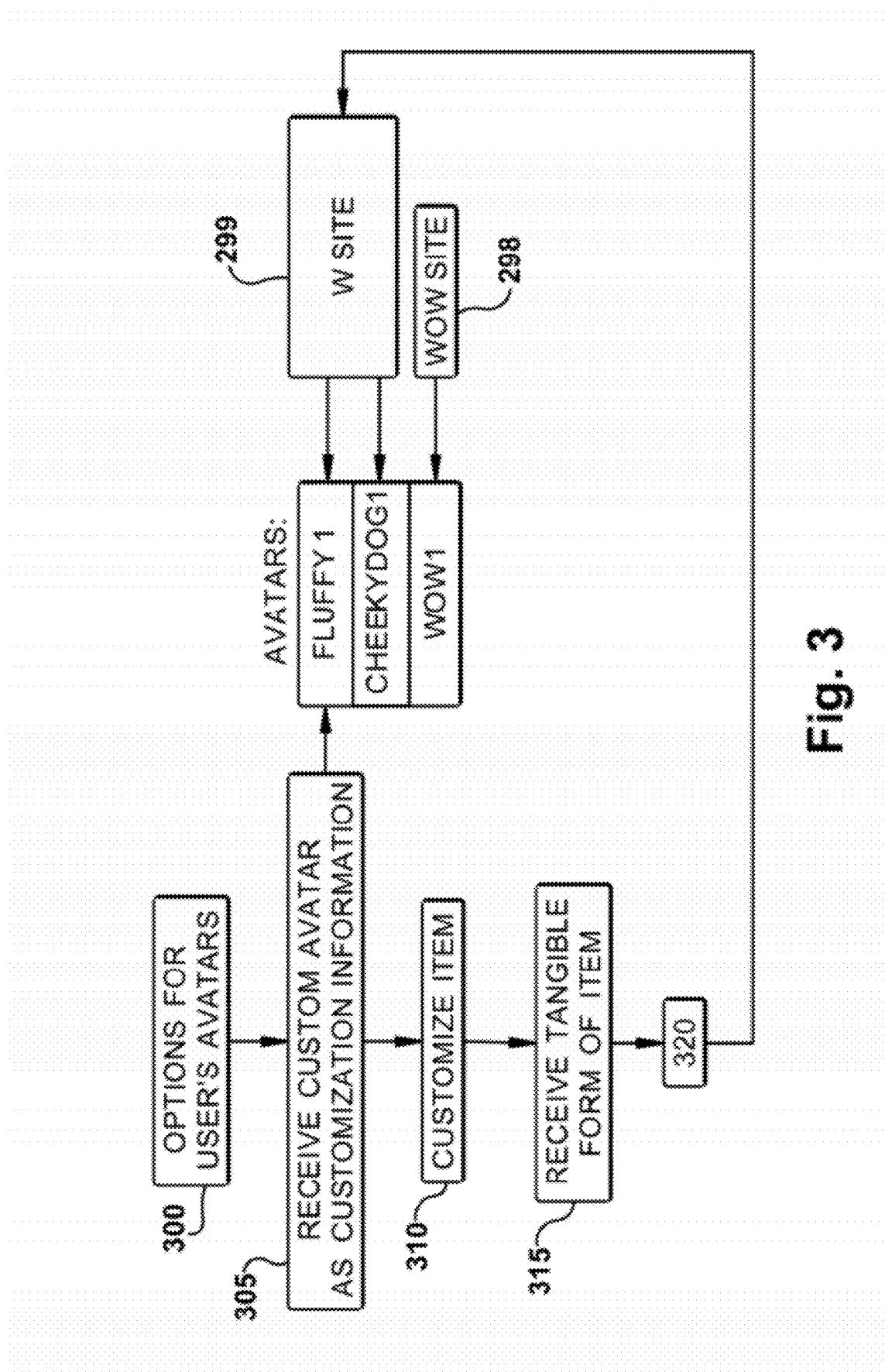
FIG. 3 shows an exemplary flowchart of creating a special kind of customized item.

In the embodiment shown in FIG. 3, the user goes to a special item customization "store". The store can be on a different website from the avatar customization website, or can be a different function on the same website as the avatar customization site.

The item customization store gives the user options for their avatar at 300. Each of a plurality of customized avatars is presented to the user at 300. The avatars are the actual items that the user has customized on the avatar customization site 299, e.g., webkinz.com™. The user's own customized avatars may be selected from a pull-down menu, for example where the user's specific customized pets may include the pets called Fluffy1, Cheeky Dog1, and Fluffy2 and any number of others. The user's avatars have been customized in a way such that customization changes the avatar.

In an embodiment, there are a number of different avatar characters such as Fluffy and Cheeky Dog. A first user's customized avatar for a first character (e.g., Fluffy) is different from a second user's customized avatar for the first character ("Fluffy"). The first user's Fluffy is different from the second user's Fluffy, based on the customization on the avatar customization site.

The avatar may also be selected from other avatars from other websites, such as an avatar from World of Warcraft ("WOW"). Such avatars, for example, may be obtained directly from the other website. For instance, the W site 299 may provide the information for the customization or information for the avatars Fluffy1 and Cheeky Dog1. The World of Warcraft website 298 may provide the avatar information for the WOW character to allow the customization. The user selects one of these avatars at 300. At 305, a customization tool receives the custom avatar as information that can be used for the item customization. The custom avatar received at 305 is the actual avatar which has been customized by the user on another website. That customized avatar from another website is then used to customize an item as in the previous embodiments. For example, the customized avatar may be used as part of a T-shirt, poster, or coffee mug.

Following the item customization process as described earlier, the customized item can then be received by the user in a tangible form as in any of the previous embodiments at 315. The user may also receive an intangible item at 320 which can be sent directly to the avatar customization site 299 as shown in FIG. 3, or can be provided as a code that can be redeemed on that site. In addition or in the alternative, the intangible item can be sent to the other site in which the avatar resides. For instance, in the WOW example mentioned above, the intangible item (made for the WOW avatar) can be sent to the WOW site for use on the WOW site.

In the embodiments described above, the websites may permit registration of various characters and customization of the avatars. Those avatars are registered, for example, along with a user name. Avatar information is stored in an account of the user. Information in that account that can be accessed later by entering a user name and password. Information about the customizations to the avatars, e.g., clothing or any other customization that the user makes to the avatar, is also stored in the account of the user.

In one embodiment, the avatars may be virtual characters or virtual pets, and those virtual characters or pets may have a similar look and/or similar characters or pets to tangible versions of toys representing virtual characters and/or pets which are provided to the user.

For example, a user may store a first pet "Fluffy", and a second pet "Joy" in their user account. Any time a user logs in to the avatar customization site using their userID and password, they obtain access to their first and second pets Fluffy and Joy. The website may also have the capability of customizing these pets/avatars.

In an embodiment disclosed above, a second website has access to the customized avatars. Customized items are created based on the actual customized avatars from the site. This thereby allows making the customized item based on the customized avatar that is actually received from the site. For example, a user can take the version of Fluffy that they have dressed up or otherwise customized. Part of the goal of the customization is to modify the avatar until the user feels it to be perfect. In this embodiment, the user automatically obtains that customized Fluffy on the second website. That customized Fluffy is based on information from the avatar customization site. The information received from the other site can be used to make a shirt or a coffee mug or any other customized item using either local machinery, or at a remote shirt or coffee making device.

Another embodiment may allow storing information about your customized avatar on a computer memory, e.g., on your desktop, or on a USB drive.

Another embodiment may use a unique code to represent the customized avatar, where that code can be entered on the other website. The code can cause lookup in a database of Fluffy's characteristics, or can itself be a feature vector that represents all of Fluffy's characteristics. The code can be a customized code number that is used on the item customization website to retrieve the avatar from the avatar customization site. The code can alternatively include other information which itself represents customized characteristics of the avatar.

Alternatively there can be communication between the websites, wherein one website directly communicates with the other website, and allows forming menus on the appropriate website.

According to another embodiment, a similar operation is carried out using two wholly separate websites without the avatar customization website necessarily sending information about the customized Fluffy to the item customization website. In this alternative embodiment, the avatar customization website allows customizing any or all of the user's avatars, storing those customized avatars in a user account associated with a user name and password, for example. The user can then interact with the customized avatar as desired on the avatar customization site. For instance, the user can play games with the customized avatars, or can interact socially between avatars. Moreover, since avatars are stored and associated with the user's name and password, the user can call up any avatar, interact with it, customize it, and store it. In this second embodiment, however, the second website does not necessarily communicate with the first website.

According to the second embodiment, the user can retrieve and customize any avatar on the item customization website, in the same way they can retrieve and customize on the avatar customization website. That is, the user may be able to retrieve a generic Fluffy on the item customization website, and add glasses, shoes, and similar things, in a similar way to the first customization website. The second customization website may have the same kinds of customizations that are in the first customization website.

Figure 4A:
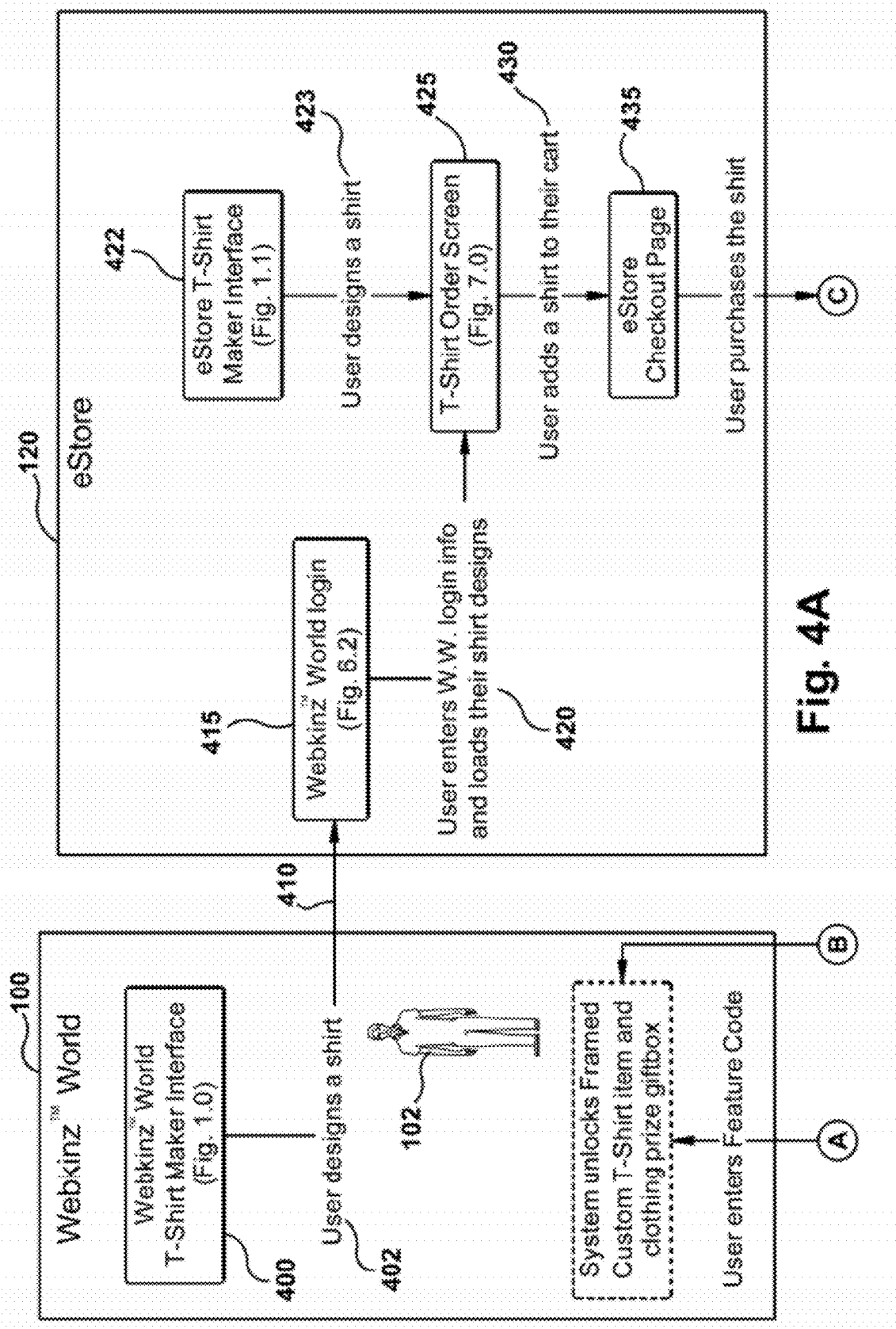
FIGS. 4A and 4B represent an exemplary flowchart of the operation of creating and making a T-shirt.
Figure 4B:
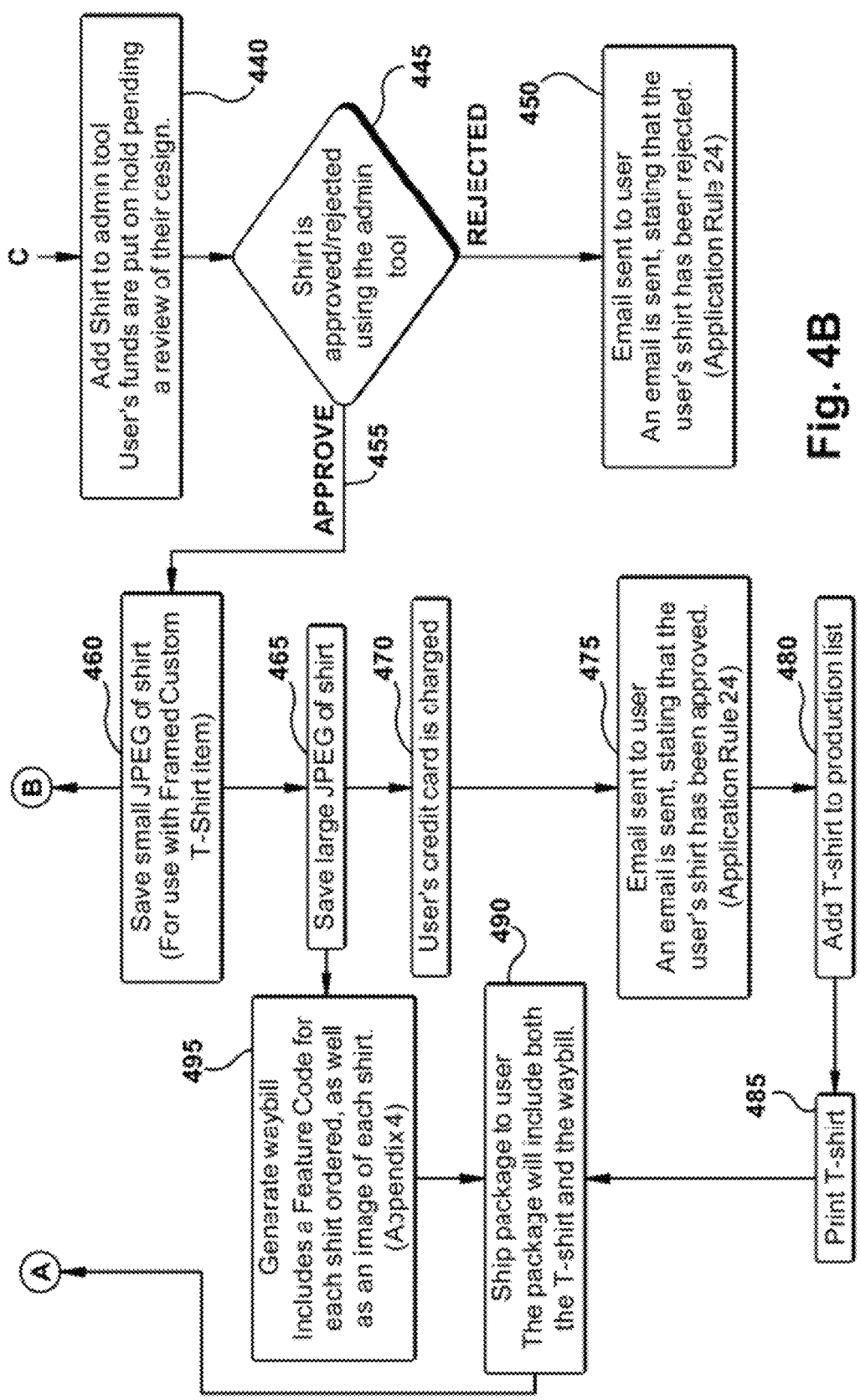

FIG. 4 illustrates a flow chart of the operation of creating and making the T-shirt. A T-shirt maker interface 400 can be accessed from both or either of the avatar website 100 and/or the E store website 120. The user designs a shirt at 402 on the avatar website 100. As described in the above embodiments, the user can also interact with one or more avatars such as 102 on the avatar website 100. The user designs a shirt at 402, for example using the flowchart of FIG. 2, and/or the screens of FIGS. 5A-14. Information 410 about the shirt is sent to the E store website 120. In this embodiment, the user logs into the E store website 120 at 415 using their login from the avatar site 100. This brings up the shirt design at 420, and brings the user to the order screen at 425.

The E store 120 website can also be directly accessed at 422, allowing the user to make their own T-shirt using an E store direct version of the T-shirt maker. Using the E store only screen, the user can design a T-shirt at 423.

After designing a T-shirt either at 402 or 423, the shirt can be added to the user's cart at 430, followed by user check out at 435.

The system then adds the shirt to the administrative tool at 442 to begin the operation of making the shirt.

At 445, the shirt contents are examined. For example, this may examine the shirt for profanity or for copyright violations, or for trademark violations, or any other content of any type, that is either objectionable, or is for any other reason desired by the maker to be proscribed. The screening may, for example, compare the content to a database of prohibited content. The database may include text, e.g., words and phrases, of profanities, trademarks and copyrights. The database may also include images, and use an automated image matching technique to determine matches to the image database. Other matching techniques can also be used. If the shirt is rejected, an e-mail or other message is sent to the user at 450 stating that the shirt design has been rejected.

The analysis tool at 445 can be an automated analysis tool looking for key words or phrases which have been defined in advance as inappropriate, rejectable or invalid for T-shirt production. As an alternative, or in addition to the automated test, a manual review of the shirt may be carried out at 445.

Once approved at 455, a number of operations are carried out. First, an image of the shirt is saved at 460 to create a custom T-shirt item that will be sent back to the main avatar site at 100. The image may be a small JPEG for use with a frame custom T-shirt item, as described herein. A higher resolution image is also saved at 465, for use in creating the shirt itself and/or for creating a packing slip at 495. At 470, the user's credit card is charged, followed by an e-mail being sent to the user at 475 stating that the shirt has been approved, and the shirt is then added to the production list at 480. At 485, the shirt is created, for example by printing. The shirt is then shipped to the user at 490.

While many of these embodiments describe creation of T-shirts, it should be understood that creation of other items may also be carried out in an analogous way.

Figure 5A:
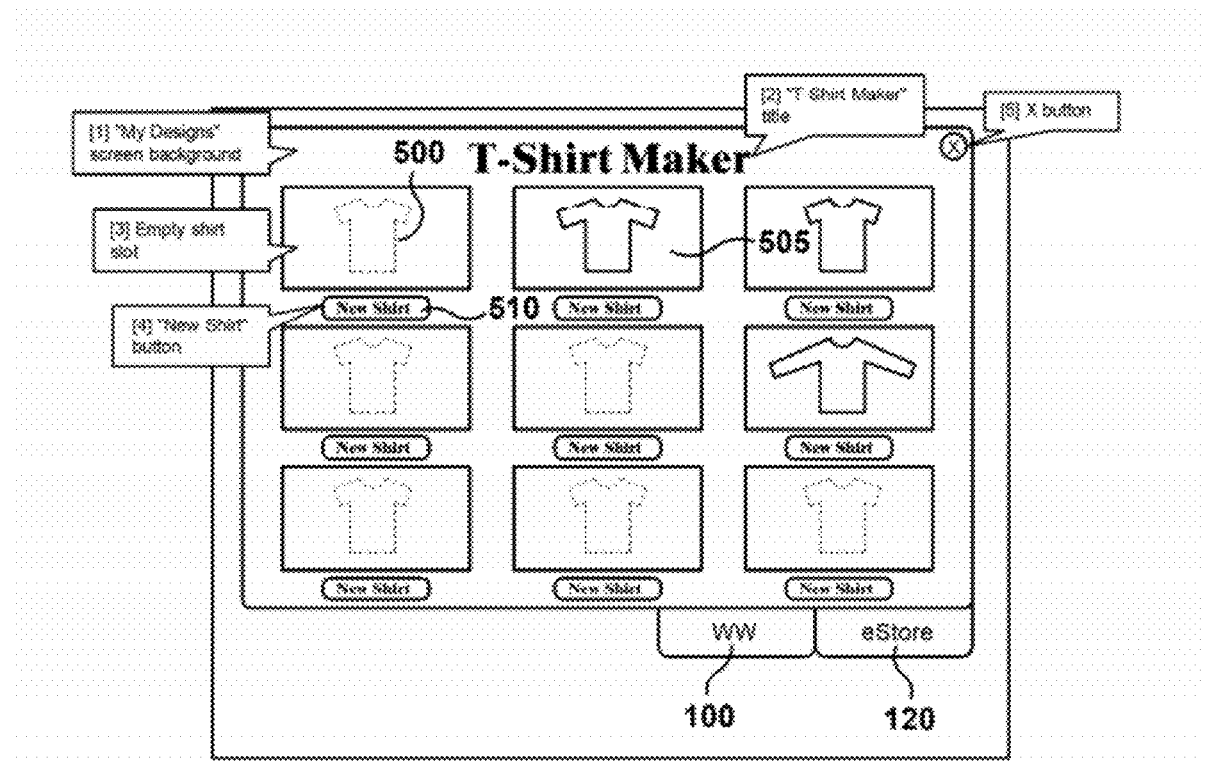
FIGS. 5A and 5B, respectively, demonstrate T-shirt maker interfaces for different websites.
Figure 5B:
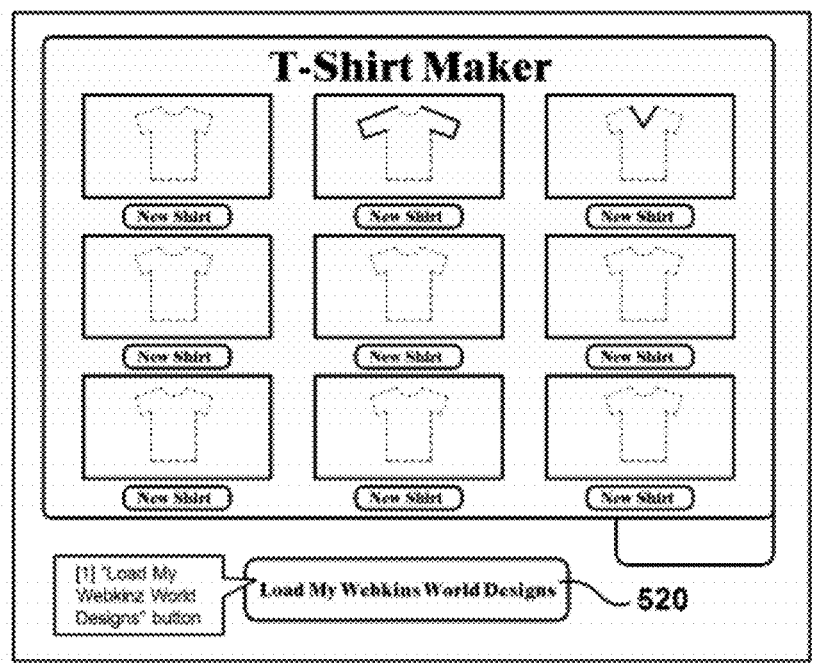

FIGS. 5A and 5B respectively show the T-shirt maker interfaces for the different websites 100, 120. These can also be shown as tabs on the screen.

FIG. 5A shows how there can be a number of styles such as style number 1 shown as 500, and style number 2 shown as 505. Each of the different T-shirt styles may be different, e.g., crew neck, V neck, long sleeve, short sleeve or other styles. A user can create a shirt by selecting the "new shirt" button 510 near any of the styles of shirts they want to create.

FIG. 5B shows a similar screen which also has a number of designs, for example the same designs as those shown in FIG. 5A. FIG. 5B is, however, executed directly from the E store site 120. Therefore FIG. 5B also includes a control 520 which allows loading designs from the avatar site 100.

Figure 6:
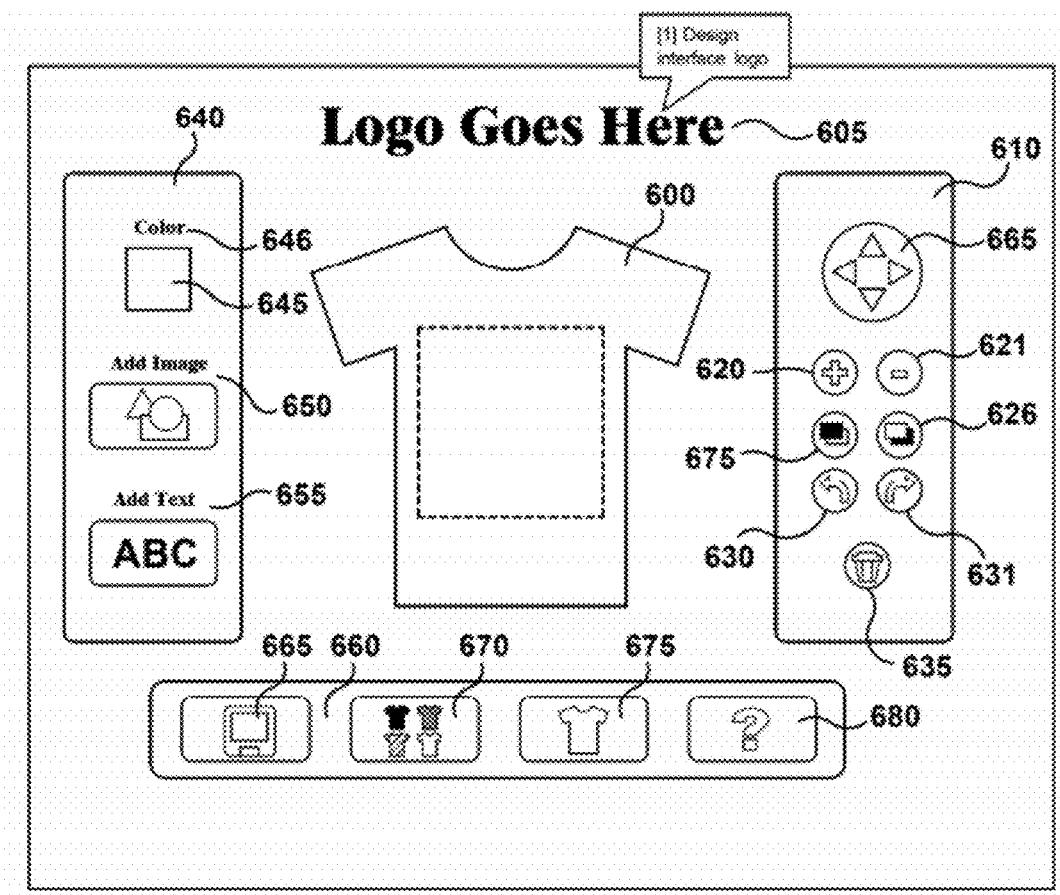
FIG. 6 shows an alternative or additional design screen of another embodiment.
Figure 7:
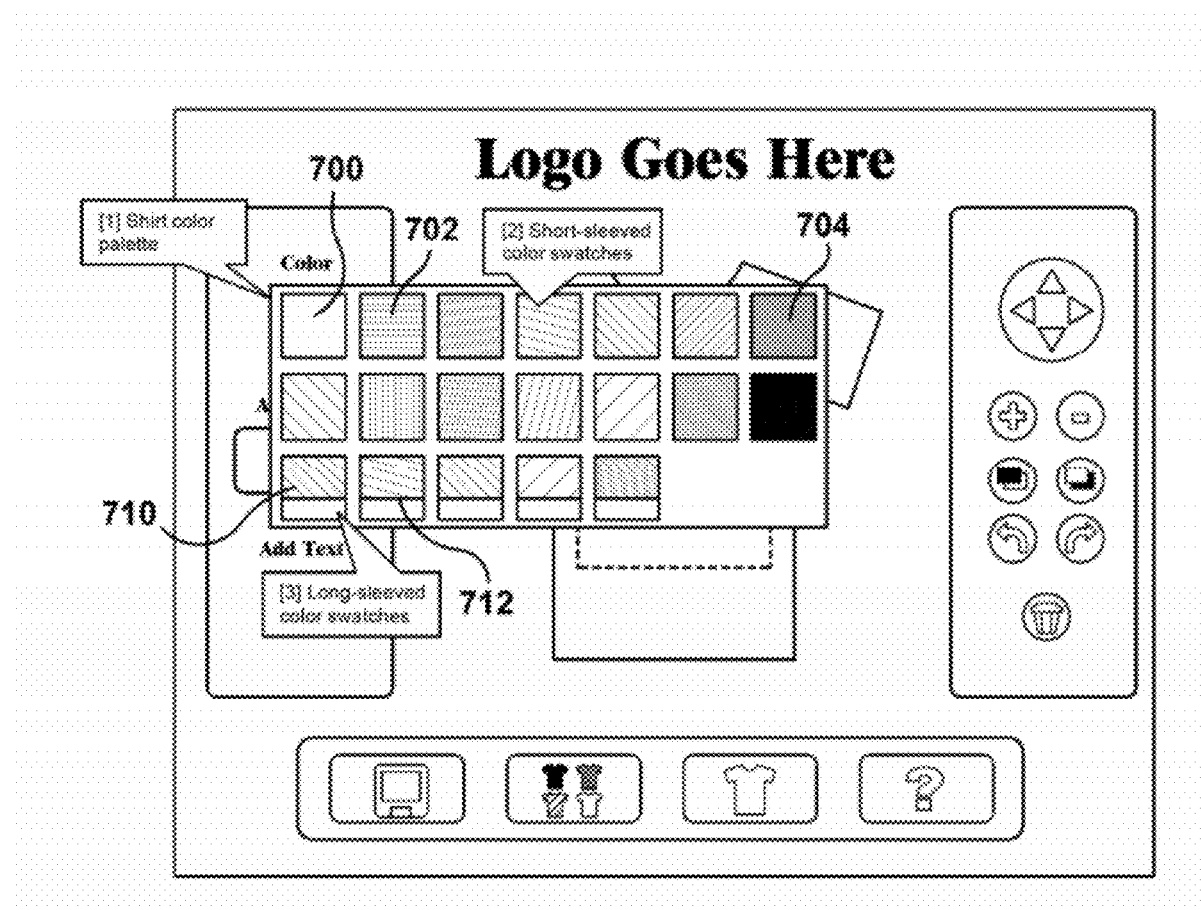
FIG. 7 shows an exemplary color palette.

Once loading the specific T-shirt design, the design screen is loaded, either to the design screen of FIG. 2, or in an alternative embodiment, the design screen of FIG. 6.

FIG. 6 shows an alternative/additional design screen of a new embodiment. This has many of the same items as FIG. 2, but also includes some additional controls. The shirt 600 is shown in the shape of a template which has been selected from the screen in FIGS. 5A/5B. For example, the logo may also be selected at 605. The logo, once selected can be controlled by the control menu 610. Control menu includes a move button 615 that allows moving the parts. Increase and decrease size buttons 620, 621 control changing the sizes. Layer changing buttons 625, 626 which allow setting the specific item being worked with to be a higher or lower priority layer. Making the layer higher priority, for example, can bring the layer in front of other layers.

The item can also be rotated left by control 630 and rotated right by control 631. In addition, the item being controlled can be removed using the trash button 635.

The item itself is controlled by the item toolbar at 640. This control allows selecting a color at 645. The specific color which is selected is shown as 646. Opening the color button brings up the color palette shown as FIG. 7. The color palette has a number of different colors such as 700, 702 for short sleeve shirts. There is also a different color palette 710, 712 for long sleeve shirts.

Figure 8A:
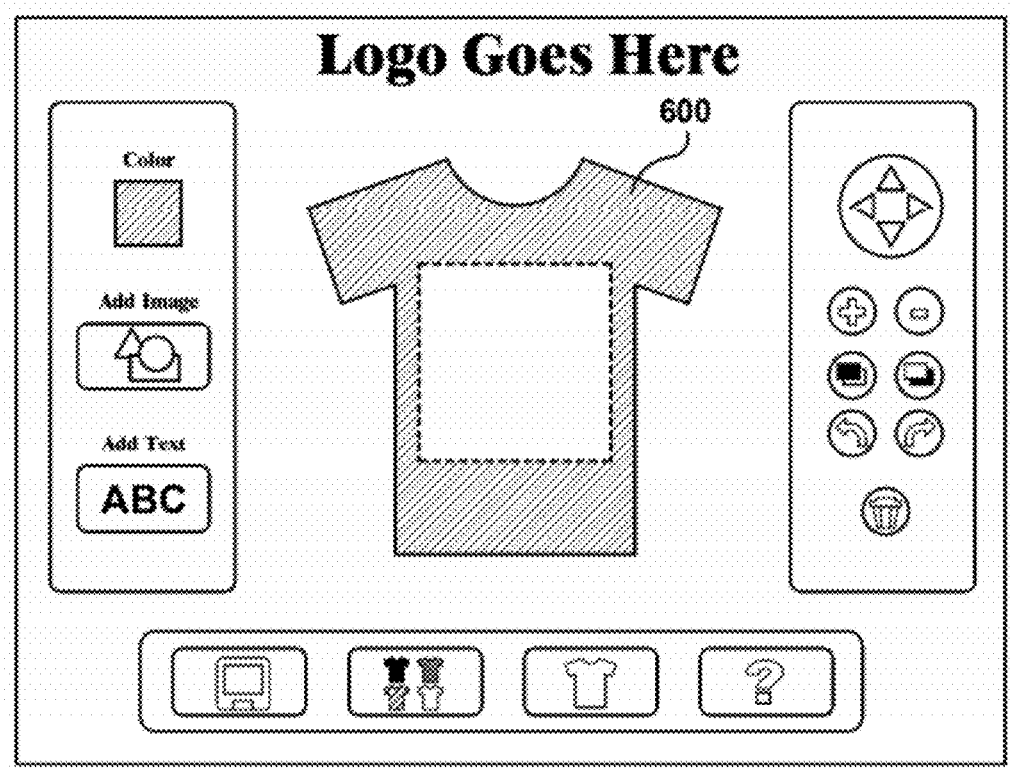
FIGS. 8A and 8B show color and shirt style selections, respectively.
Figure 8B:
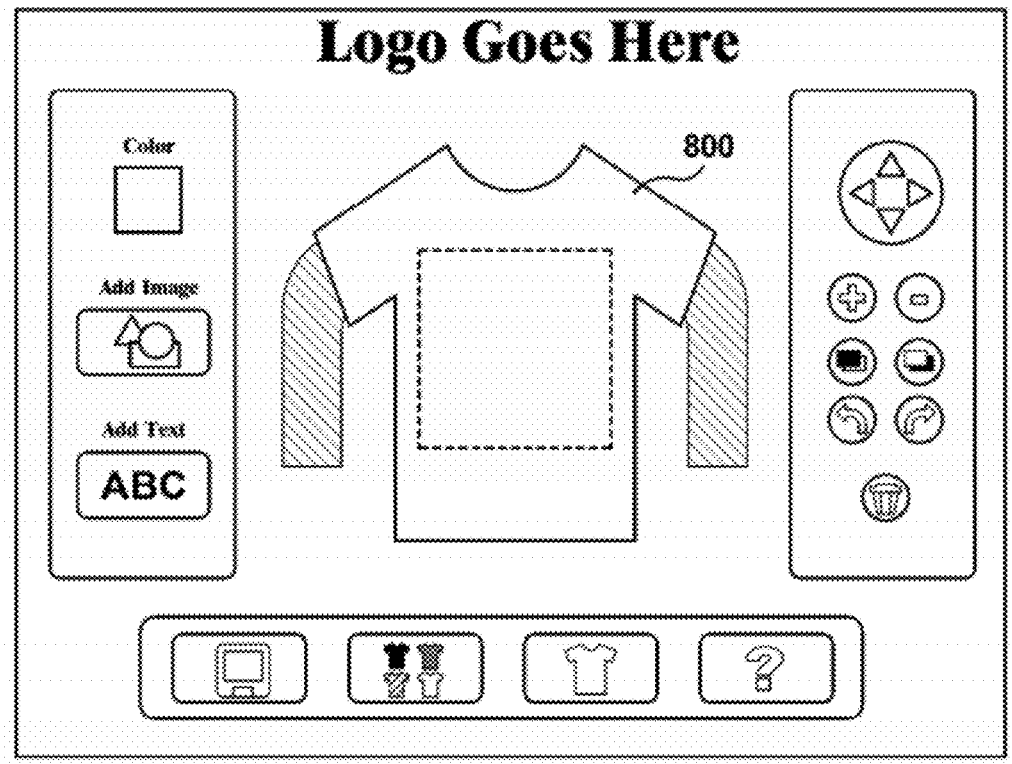

When a color is selected, the shirt 600 is changed to show that color. FIG. 8A illustrates the color 704 having been selected, and shows the shirt 600 in the color 704. FIG. 8B illustrates that a long sleeve shirt template has been selected as 800, and illustrates the color palette 710 having been selected for that color.

Figure 9:
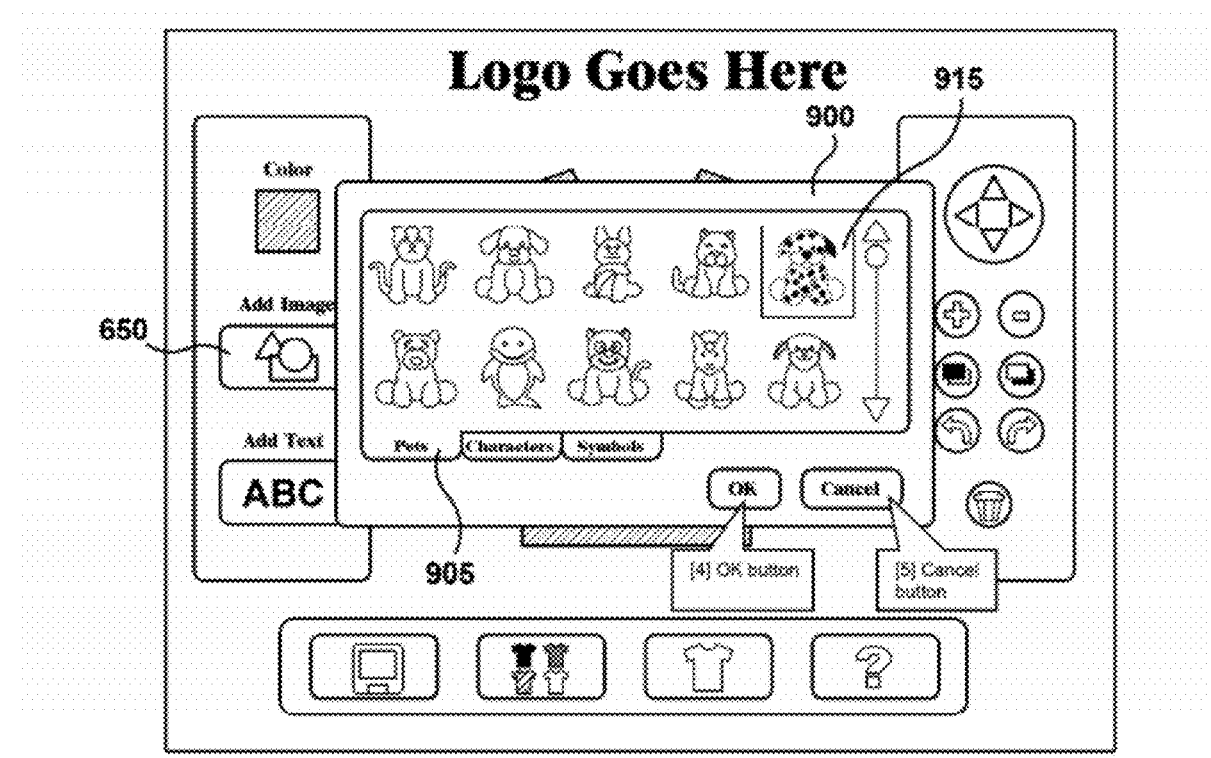
FIG. 9 shows an image select window.

An image can be added at 650. Selecting the add image button at 650 brings up the image select window 900 of FIG. 9. The image select window 900 includes a number of different images arranged as image categories with image category tabs 905. For example, the pets category is shown in FIG. 9. The user can select one of these pets 915 as the image to go on the T-shirt.

Figure 10:
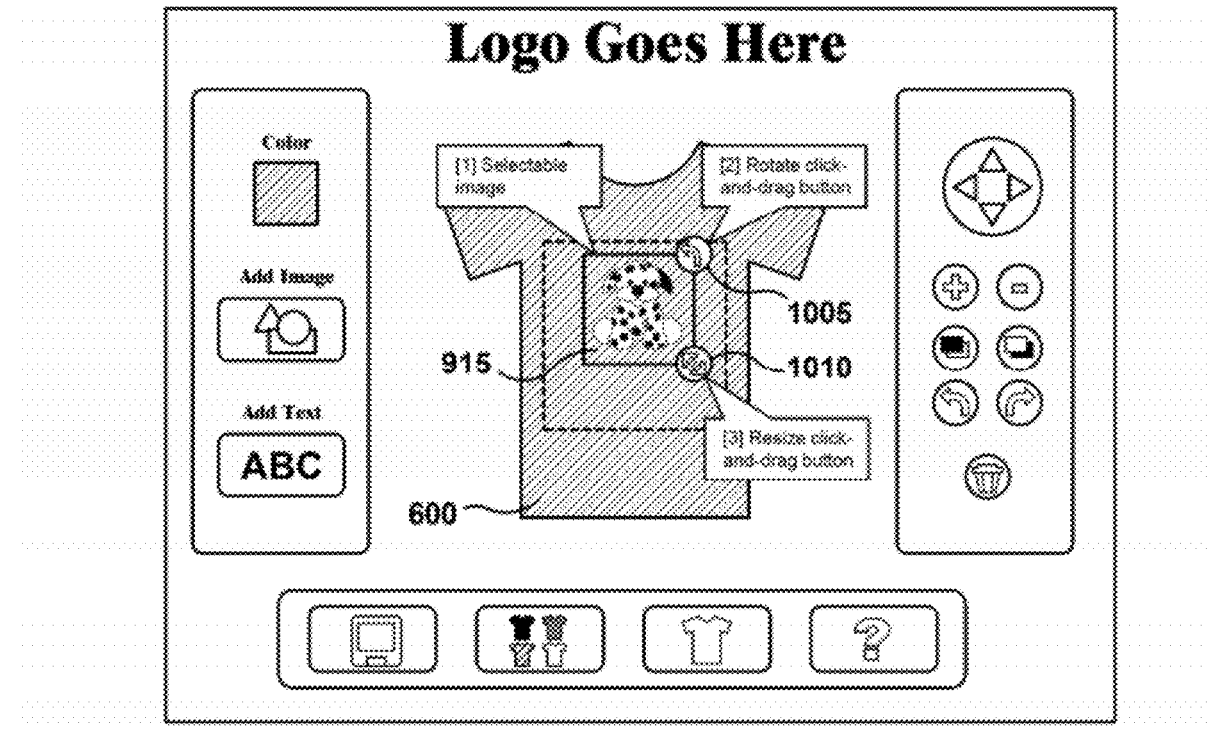
FIG. 10 illustrates another interface for viewing a selected pet on the shirt.

FIG. 10 illustrates how the selected pet 915 is then shown on the image of the shirt. Once placed on the shirt, certain controls are also shown, including a rotate control at 1005, and a resize control at 1010.

Figure 11:
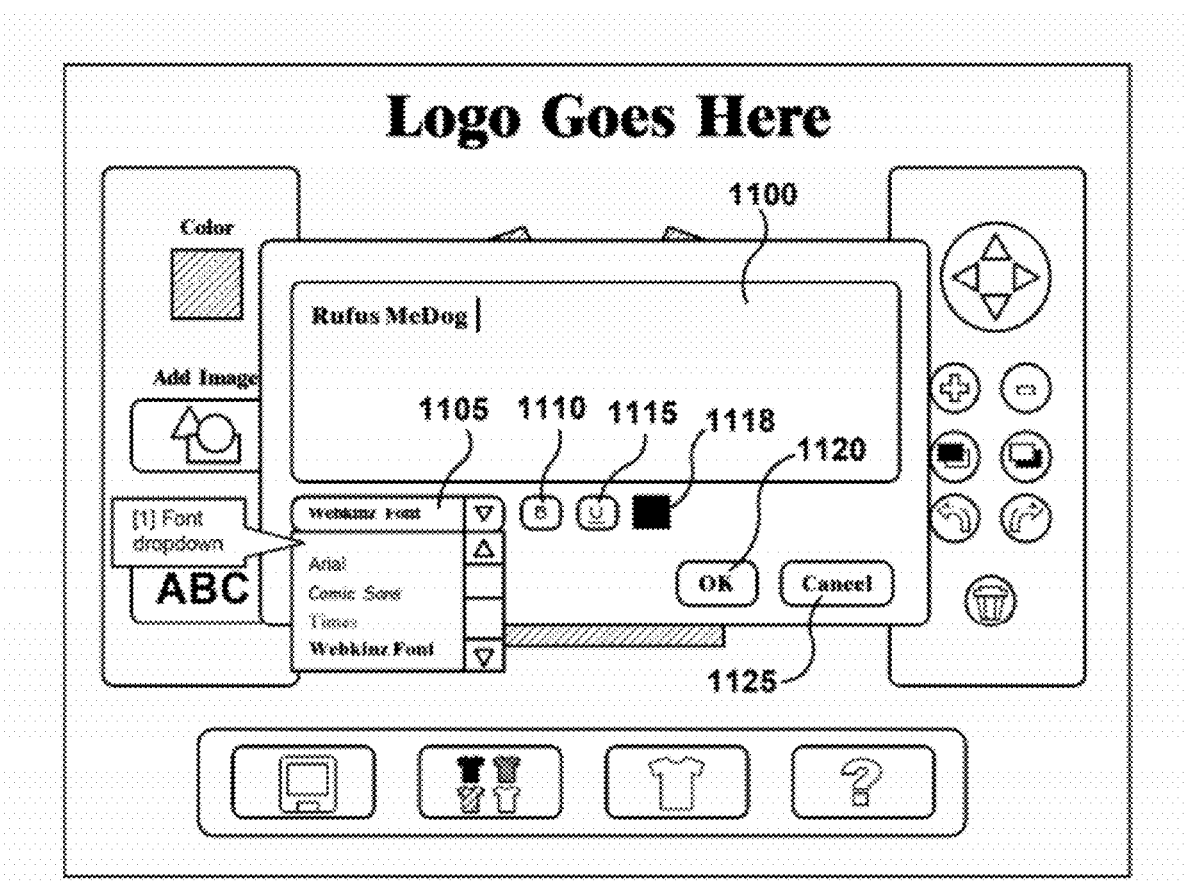
FIG. 11 shows an exemplary text menu for adding text to shirt design.
Figure 12:
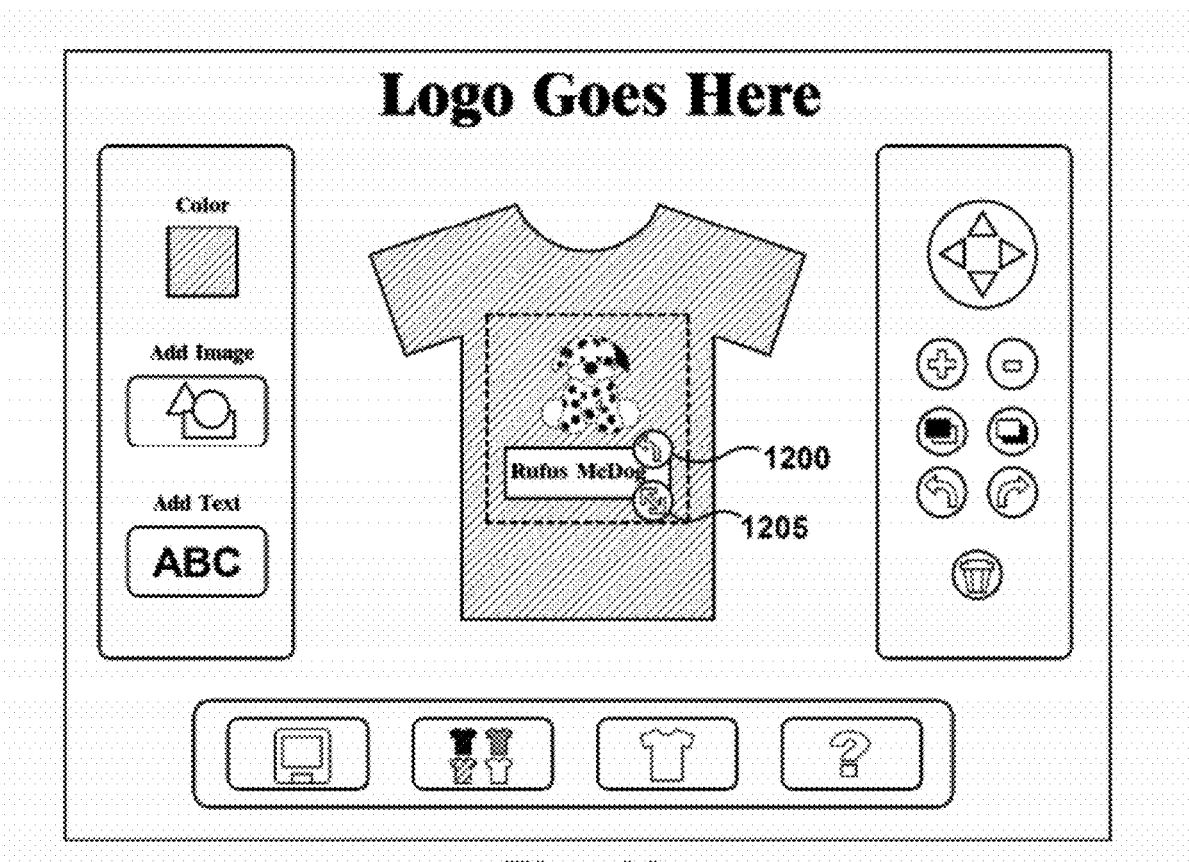
FIG. 12 shows a preview of the selected text on the shirt.

Text can be added at 655. This brings up the add text menu of FIG. 11 which allows entering the text to be added on the shirt. This includes a text area 1100 into which the words can be typed. A drop-down font creator 1105 allows selecting the font in which the words will be shown. Those words can be bolded at 1110, or underlined at 1115. The user can then select okay at 1120 or cancel at 1125. A color palette at 1118 can also be used to select the color which brings up a color information screen. The text which has been selected at FIG. 11 is shown on the shirt in FIG. 12. This is shown with a rotate control 1200, and a resize control 1205.

Any of these form information on the T-shirt. The save bar 660 includes a save button 665, a view-my-designs button 670, restart button 675, and a help button 680.

Every time the item on the shirt is changed, the view of the shirt that is seen by the user is also changed. This "animates" the t-shirt based on what the user adds to the customization screen(s).

Figure 13:
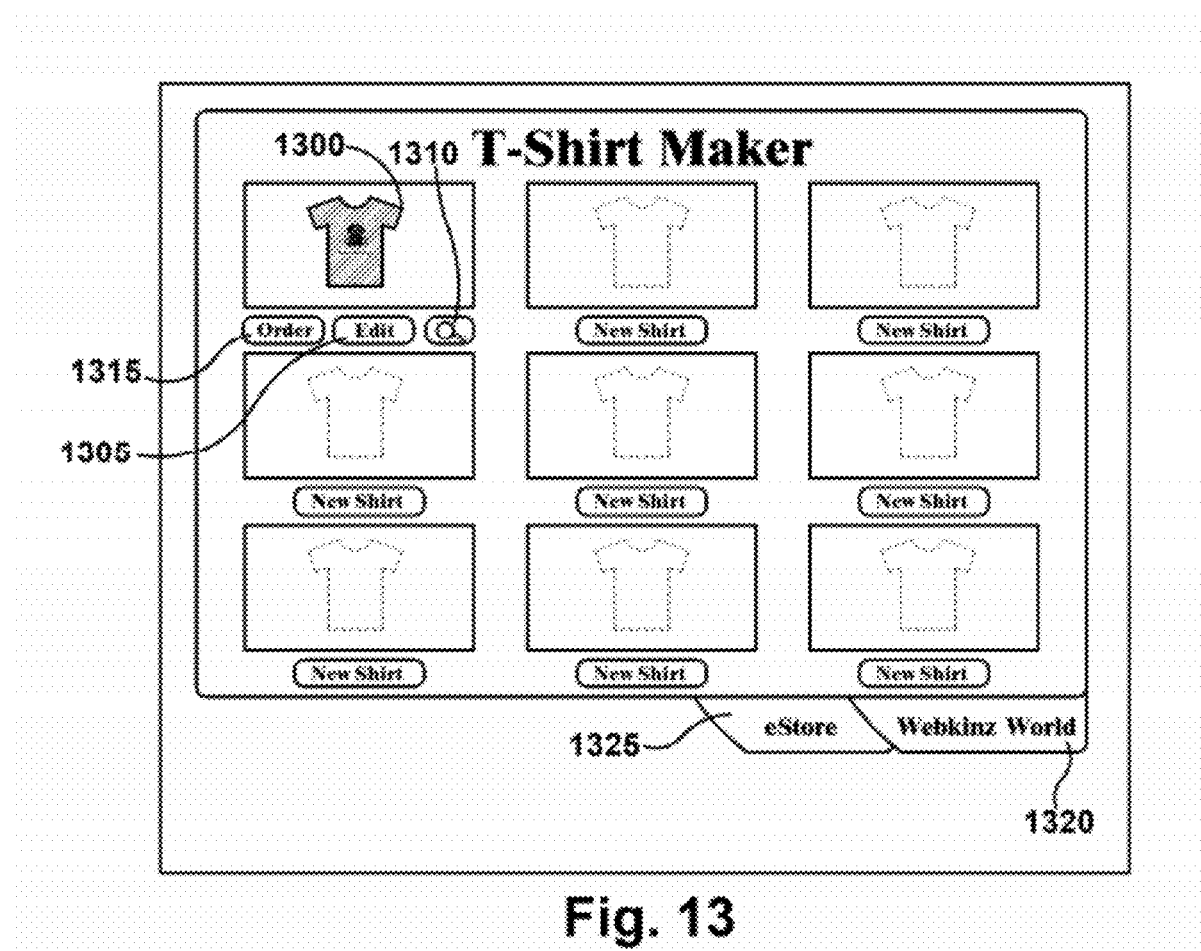
FIG. 13 shows a completed product.

After the user has finished creating the shirt using the tool of FIG. 6, and selects "done", the shirt appears within the T-shirt maker shown in FIG. 13 as a completed-shirt-slot 1300. A completed shirt slot shows the created shirt, and its different controls. Instead of the new shirt button 510, this has an edit button 130 and a zoom button 1310 that allows viewing a larger view of the shirt. The user is also presented with an order button (once logged in) at 1315. The user may also receive tabs once logged in: one tab for the avatar site and the second tab 1325 for the E store site.

Figure 14:
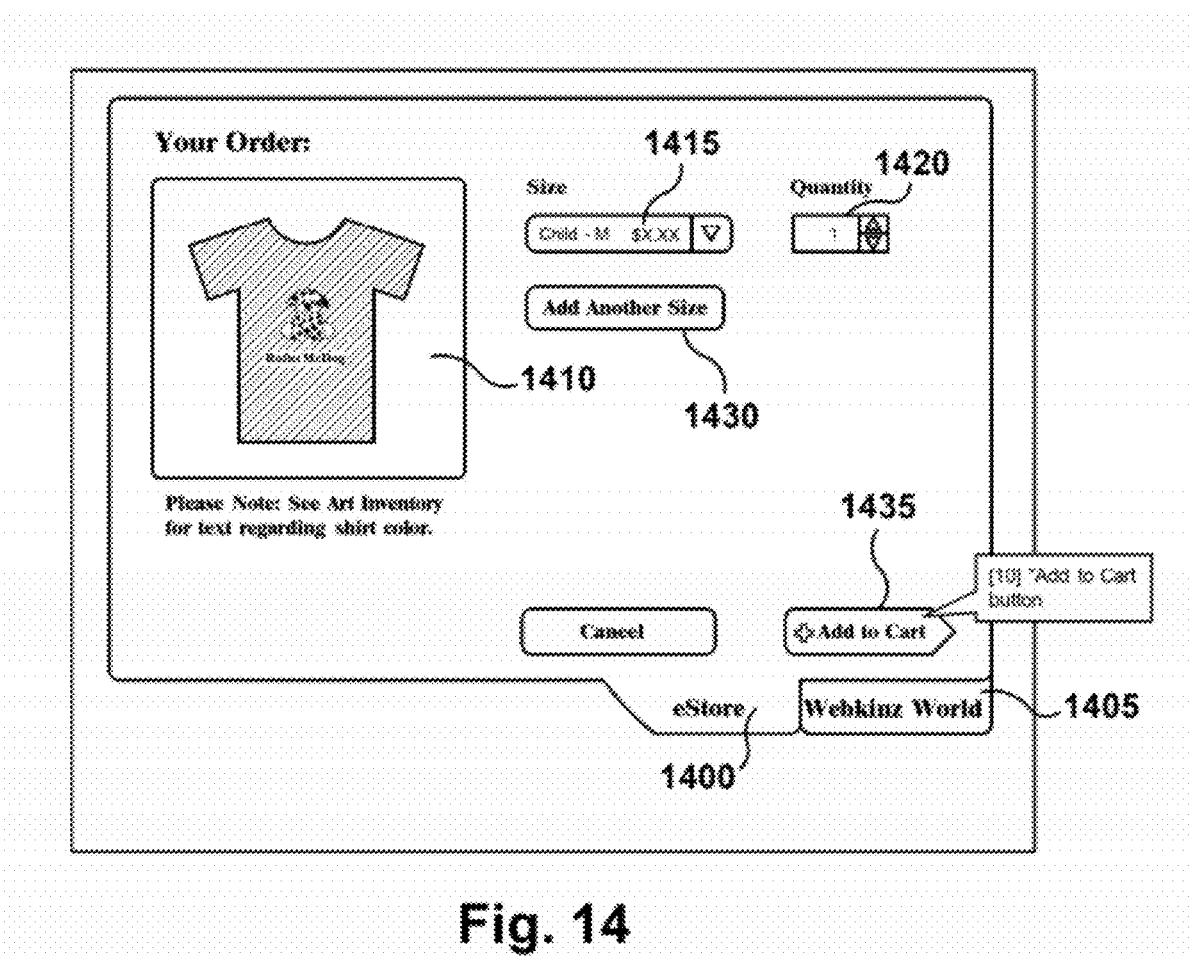
FIG. 14 demonstrates an order screen.

FIG. 14 illustrates the order screen. This order screen can be shows based on selected tabs. One of those tabs is the E store version of the order 1400. Another of those tabs comprises the avatar site version of the order at 1405.

The order screen shows a preview 1410 of the shirt, in color. The user can then select a shirt size at 1415 from a drop-down menu, and select the quantity of those shirts. The user can also add another size to be selected at 1430. After that, the shirt can be added to the cart at 1435 and eventually be purchased.

Figure 15:
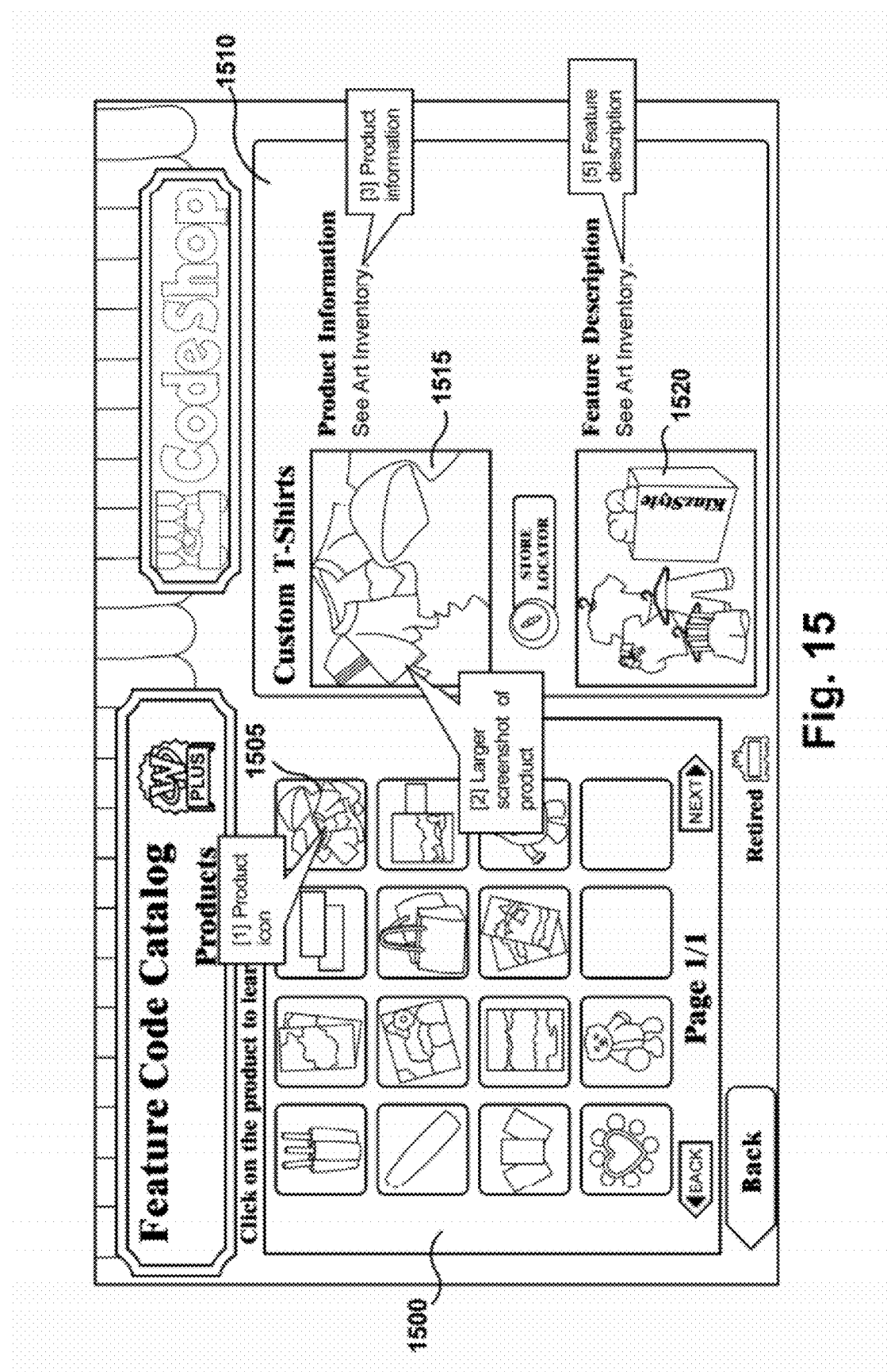
FIG. 15 demonstrates a product selection interface wherein the custom product is displayed together with virtual prizes associated with it.
Figure 16:
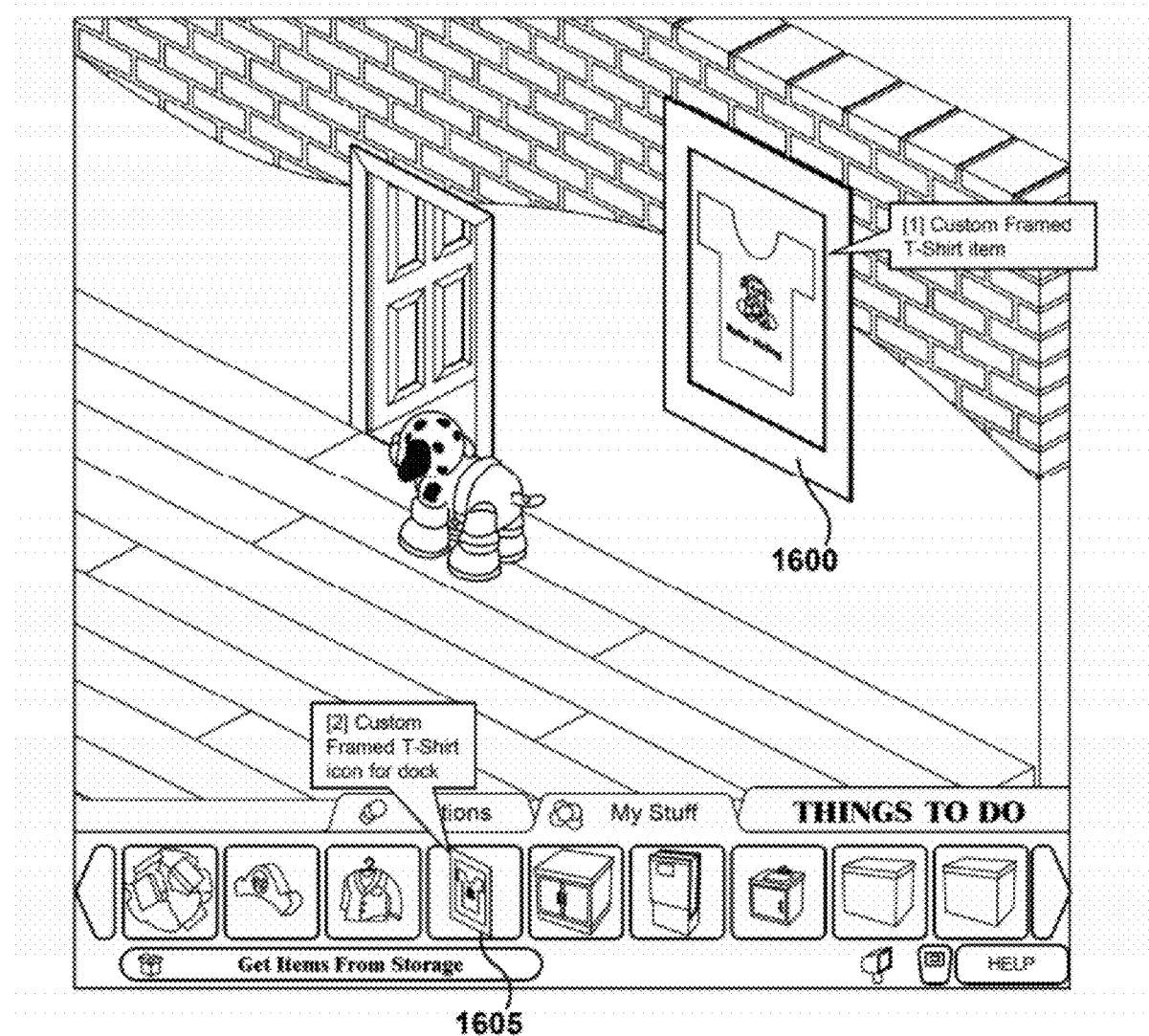
FIG. 16 demonstrates a virtual copy of the purchased product being placed in the user's virtual area.

According to an embodiment, when the shirt is purchased from the avatar site, the purchase includes a virtual "prize" which can be used and/or displayed on the avatar site. FIG. 15 illustrates an embodiment where the product selection 1500 can include virtual T-shirts such as 1505. Selecting one of these virtual T-shirts brings up the screen 1510 that shows both the custom T-shirts 1515, and also shows the virtual prize 1520 which can be received with those custom T-shirts. The user can select one of a number of different virtual prizes. Also, after purchasing the T-shirt, the user gets a virtual copy of the T-shirt shown as 1600 in FIG. 16. In an embodiment, the virtual copy of the T-shirt may include a custom framed T-shirt item which can be placed in the various locations within the user's virtual room. The framed item can also be held within the user's dock at 1605 and removed from that dock to be located on the walls etc. It can be placed on walls or other decoratable sections of the user's virtual area.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other sites and rewards can be used. Other customizations are possible. While the above describes operation on two different sites (avatar customization and E store), the operation can be done on a single site.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The computers described herein may be any kind of computer, either general purpose, or some specific purpose computer such as a workstation, running any program.

The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

What is claimed is:
1. A system, comprising:
a server computer that creates a user interface on a website and that accepts a code to register an item, and said register of the item stores information indicative of an avatar in a user account, wherein said avatar is indicative of said item, and said register allows a user to enter customization information, said customization information including information that customizes said avatar; and an interface part that produces outputs to create a customized version of said avatar based on said customization information to produce a tangible version of said avatar based on said customization information, and wherein said outputs include a second code which is provided to a user, said second code being redeemable on a second website to create said tangible version of said avatar, wherein said tangible version of said avatar includes a customized item of clothing, a customized room decoration, a customized furnishing, a customized dish, a customized cup, a customized toy, or a customized pet supply.

2. A system as in claim 1, wherein said computer further comprises an obscenity filter which limits the customization information based on detecting at least one of obscenity and proscribed content.

3. A system as in claim 1, wherein said website creates a virtual representation of said item on said website.

4. A system as in claim 1, wherein said server computer also imports information indicative of customized avatars from other sites, and uses those customized avatars to produce said tangible version.

5. A system as in claim 1, wherein said item is an item of clothing of a type wherein a virtual representation of said item can be worn by a character on said website.

6. A system as in claim 1, wherein said item is a room furnishing, and a virtual representation of said item is used to decorate a virtual room on said website.

7. A system as in claim 1, wherein said information is a first code which, when entered into the website, causes a virtual version of a customized item to be shown on said website.

8. A system as in claim 1, wherein said outputs include a second code which is redeemed to obtain said tangible version of said avatar.

9. A system as in claim 1, further comprising another website, said another website accepting a character code to obtain a virtual character on said another website, and wherein said virtual character interacts with a virtual version of said item.

10. A system as in claim 1, further comprising another website which receives directly said information and automatically causes a virtual version of said item to be created on said another website.

11. A system as in claim 1, wherein a virtual version of said item and said tangible version look the same.

12. A system as in claim 1, wherein a virtual version of said item and said tangible version look different but are based on the same customization information.

13. A system as in claim 1, wherein said server computer produces another user interface portion that controls virtually caring for said avatar by the user.

14. A system as in claim 13, wherein said virtually caring for changes a parameter in said user account associated with said avatar.

15. A system as in claim 14, where said parameter is one of multiple parameters representing health, happiness and hunger of a virtual persona of the avatar.

16. A system as in claim 1, wherein said server computer produces another user interface portion that controls virtually training by a user.

17. A system as in claim 16, wherein said virtually training changes a parameter in said user account associated with said avatar.

18. A system as in claim 17, where said parameter is one of multiple parameters representing skills, attributes and talents that control interacting with the avatar.

19. A method, comprising:
customizing a virtual item representing an avatar on a computer using a user interface;
providing first information that controls customizing a virtual item representing a virtual customized item that is separate from said avatar and usable with said avatar, said virtual item being viewable over a network based on said computer; and
providing second information that controls obtaining a tangible item representing said virtual customized item based on said customizing, the tangible item and the virtual item based on said customizing, wherein said first information is a first code which is entered into a website to cause a virtual representation of said customized item to be shown on said website, and said second information is a second code that is redeemed on a separate website to create said tangible item,
wherein said tangible item representing said virtual customized item is a customized item of clothing, a customized room decoration, a customized furnishing, a customized dish, a customized cup, a customized toy, or a customized pet supply.

20. A method as in claim 19, further comprising entering a character code into a website to obtain a virtual character on the website, and wherein said virtual character interacts with the virtual item.

21. A method as in claim 20, wherein said item is an item of clothing of a type where said virtual item can be worn by an avatar on the website.

22. A method as in claim 20, wherein said item is a room decoration, and said virtual item is used to decorate a virtual room on the website.

23. A method as in claim 19, wherein said first information is a code which, when entered into a website, causes said virtual item representing said customized item to be shown on said website.

24. A method as in claim 19, wherein said second information is a code which is redeemed to obtain said tangible item.

25. A method as in claim 19, wherein said first and second codes are redeemed on the same website.

26. A method as in claim 19, wherein said virtual item and said tangible item look the same.

27. A method as in claim 19, wherein said virtual item and said tangible item look different but are based on the same customization information.

28. A method as in claim 19, further comprising limiting the customizing based on an obscenity filter.

29. A method as in claim 19, further comprising virtually caring for the virtual customized item by a user.

30. A method as in claim 29, wherein said virtually caring for the virtual customized item changes a parameter in a user account associated with said virtual customized item.

31. A method as in claim 30, where said parameter is one of multiple parameters representing health, happiness and hunger of a virtual persona of the virtual customized item.

32. A method as in claim 19, further comprising virtually training said virtual customized item by a user.

33. A method as in claim 32, wherein said virtually training changes a parameter in a user account associated with said virtual customized item.

34. A method as in claim 33, wherein said parameter is one of multiple parameters representing skills, attributes and talents that allow interacting with the virtual customized item.

35. A method as in claim 19, wherein said virtual customized item is registered based on a code that is associated with a tangible product that is purchased by a user.

36. A system, comprising:
a server computer that presents a first user interface to users which controls registering an avatar based on a code entered into a website, where the code represents a specific avatar that is different than another avatar, and wherein said server computer includes information about multiple customized avatars associated with a user account, where there are a number of different avatar characters, and a first user's customized avatar for a first character is different from a second user's customized avatar for said first character; and
said server computer recognizing a selection of one of said multiple customized avatars, and forming customizing information that defines customization of an item and that produces customization information indicative of the customized item with the at least one of the first user's and second user's customized avatar, said customization information allowing creating a tangible version of the customized item and said server computer producing a code which is redeemed to obtain said tangible version of the customized item,
wherein said tangible version of said customized item is a customized item of clothing, a customized room decoration, a customized furnishing, a customized dish, a customized cup, a customized toy, or a customized pet supply.

37. A system as in claim 36, further comprising a device that controls creating said tangible version from the customization information.

38. A system as in claim 36, wherein said server computer further creates an intangible version of said customized item from said customization information.

39. A system as in claim 38, wherein said intangible version of said customized item has at least one part that looks different from said tangible version of said customized item, but is based on the same customization information.

40. A system as in claim 36, further comprising a different website than that hosted by said server computer, said different website controlling customization of said avatar that is displayed by said server computer.

41. A system as in claim 36, wherein said user interface shows a pull-down menu which displays a plurality of the user's customized avatars as part of said pull-down menu.

42. A system as in claim 36, wherein said server computer produces a second user interface that controls interacting with said customized avatar to change a characteristic of said customized avatar through said interacting.

43. A system as in claim 42, wherein said interacting comprises virtually caring for said customized avatar by the user.

44. A system as in claim 43, wherein said virtually caring for said customized avatar changes a parameter in said user account associated with said avatar.

45. A system as in claim 44, where said parameter is one of multiple parameters representing health, happiness and hunger of a virtual persona of the avatar.

46. A system as in claim 43, wherein said server computer produces a third user interface for said interacting that controls virtually training by a user.

47. A system as in claim 46, wherein said virtually training changes a parameter in said user account associated with said avatar.

48. A system as in claim 47, where said parameter is one of multiple parameters representing skills, attributes and talents that control interacting with the avatar.

49. A method, comprising:
controlling customization of a generic avatar on a first website to create a first customized avatar;
controlling the first customized avatar in a first way to carry out a first function on the first website;
controlling customization of the generic avatar on a second website to create a second customized avatar;
using the second customized avatar in a second way on the second website, where the second way is different than the first way; and
on a third website, importing both the first and second customized avatars, and creating a customized item using at least one of said first and second customized avatars to create a virtual version of the customized item on the third website as a virtual customized item, and providing information that creates a tangible version of the customized item, said information also being based on said virtual customized item,
wherein said tangible version of said customized item is a customized item of clothing, a customized room decoration, a customized furnishing, a customized dish, a customized cup, a customized toy, or a customized pet supply.

50. A method as in claim 49, wherein said using the first customized avatar in the first way comprises interacting with said first customized avatar to change a characteristic of said first customized avatar through said interacting with the first customized avatar, and wherein said using the second customized avatar in the second way comprises forming the customized item based on the second customized avatar.

51. A method as in claim 50, wherein said first customized avatar is registered based on a code that is associated with a tangible product that is purchased by a user.

52. A method as in claim 49, wherein said controlling the first customized avatar in the first way comprises virtually caring for the first customized avatar by a user.

53. A method as in claim 52, wherein said virtually caring for changes a parameter in a user account associated with said first customized avatar.

54. A method as in claim 53, where said parameter is one of multiple parameters representing health, happiness and hunger of a virtual persona of the first customized avatar.

55. A method as in claim 49, wherein said controlling the customized avatar in the first way comprises virtually training said first customized avatar by a user.

56. A method as in claim 55, wherein said virtually training changes a parameter in a user account associated with said first customized avatar.

57. A method as in claim 56, where said parameter is one of multiple parameters representing skills, attributes and talents that allow interacting with the first customized avatar.

* * * * *